(12) United States Patent
Tezcan et al.

(10) Patent No.: US 11,975,307 B2
(45) Date of Patent: May 7, 2024

(54) SELF-HEALING MACROMOLECULAR CRYSTAL MATERIALS

(71) Applicant: The Regents of the University of California, Oakland, CA (US)

(72) Inventors: Faik Tezcan, La Jolla, CA (US); Jake Bailey, La Jolla, CA (US); Ling Zhang, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 958 days.

(21) Appl. No.: 16/763,971

(22) PCT Filed: Nov. 13, 2018

(86) PCT No.: PCT/US2018/060855
§ 371 (c)(1),
(2) Date: May 13, 2020

(87) PCT Pub. No.: WO2019/094981
PCT Pub. Date: May 16, 2019

(65) Prior Publication Data
US 2020/0384440 A1     Dec. 10, 2020

Related U.S. Application Data

(60) Provisional application No. 62/666,030, filed on May 2, 2018, provisional application No. 62/585,433, filed on Nov. 13, 2017.

(51) Int. Cl.
*B01J 20/26* (2006.01)
*B01J 20/24* (2006.01)
(Continued)

(52) U.S. Cl.
CPC ............ *B01J 20/261* (2013.01); *B01J 20/24* (2013.01); *B01J 20/28047* (2013.01); *B01J 20/3425* (2013.01); *B01J 20/345* (2013.01)

(58) Field of Classification Search
None
See application file for complete search history.

(56) References Cited

U.S. PATENT DOCUMENTS 5,250,515 A * 10/1993 Fuchs .................... A01N 63/50
530/370
5,264,364 A * 11/1993 Donovan ............... A01N 63/50
435/6.15
(Continued)

OTHER PUBLICATIONS

Cai et al. "Photonic crystal protein hydrogel sensor materials enabled by conformationally induced volume phase transition" Chem. Sci. Jul. 2016, 4557-4562.
(Continued)

*Primary Examiner* — Joseph D Anthony
(74) *Attorney, Agent, or Firm* — Perkins Coie LLP

(57) ABSTRACT

Hybrid materials are disclosed including molecular/protein crystals integrated with synthetic polymers. The disclosed materials combine the structural order and periodicity of crystals, the adaptiveness and tunable mechanical properties of polymeric networks, and the chemical versatility of protein building blocks. Some of the properties of the disclosed materials include the following: 1) allows crystals—which are typically rigid and brittle—to expand and contract reversibly; 2) incorporates polymers to increase the mechanical toughness of the crystals and allow self-healing; 3) reversibly expand/contract crystal lattices and mobilize the protein components therein may provide a new means to improve X-ray diffraction quality and explore otherwise inaccessible protein structural states using 3D protein crystallography; 4) creation of chemically and mechanically differentiated domains within single crystals. Some example embodiments combine the properties of hydrogels (flexibility, adaptability, elasticity, self-healing), crystals (structural order) and proteins (chemical and genetic tailorability).

21 Claims, 24 Drawing Sheets

(51) Int. Cl.
    *B01J 20/28*    (2006.01)
    *B01J 20/34*    (2006.01)

(56) References Cited

U.S. PATENT DOCUMENTS

| | | |
|---|---|---|
| 2001/0026946 A1 | 10/2001 | Asher |
| 2003/0102263 A1* | 6/2003 | Lopez .............. G01N 27/44773 |
| | | 210/639 |
| 2004/0018160 A1 | 1/2004 | Hu et al. |
| 2004/0115132 A1 | 6/2004 | Young et al. |
| 2007/0258889 A1 | 11/2007 | Doughlas et al. |
| 2010/0015218 A1* | 1/2010 | Jadhav .................... A61P 43/00 |
| | | 435/320.1 |
| 2013/0156697 A1* | 6/2013 | Vitaliano ....... C12Y 301/03048 |
| | | 424/193.1 |

OTHER PUBLICATIONS

ISA, International Search Report and Written Opinion for International Application No. PCT/US2018/060855, dated Feb. 11, 2019. 10 pages.

Jia et al. "Hybrid Multicomponent Hydrogels for Tissue Engineering" Macromol Biosci. Feb. 11, 2009, vol. 9, No. 2, pp. 140-156.

\* cited by examiner

|  | Crystal A (6B8F) | Crystal B (6B8G) |
|---|---|---|
| Data collection | | |
| Space group | F432 | F432 |
| Cell dimensions | | |
|   $a, b, c$ (Å) | 180.40 | 179.95 |
|   $\alpha, \beta, \gamma$ (°) | 90 | 90 |
| Resolution (Å) | 63.65-1.06 | 63.62-1.13 |
| Number of unique reflections | 111189 | 92912 |
| Multiplicity | 14.0 (2.4) | 32.2 (13.8) |
| $CC_{1/2}$ | 0.999 (0.897) | 0.999 (0.628) |
| $R_{merge}$ | 0.060 (0.222) | 0.131 (1.131) |
| $<I/\sigma I>$ | 24.8 (3.2) | 19.1 (2.3) |
| Completeness (%) | 99.0 (86.4) | 100 (100) |
| Average mosaicity (°) | 0.17 | 0.31 |
| Total solvent content (%) | 57.42 | 57.36 |
| Interstitial solvent content (%) | 39.72 | 39.62 |
| Refinement | | |
| $R_{work} / R_{free}$ | 0.0910/0.1026 | 0.1029/0.1213 |
| Number of atoms | | |
|   Protein | 1687 | 1699 |
|   Ligand/ion | 13 | 13 |
|   Water | 340 | 372 |
| B-factors (Å2) | | |
|   Protein | 8.51 | 9.81 |
|   Ligand/ion | 10.19 | 11.96 |
|   Water | 21.83 | 23.75 |
| Root-mean-square deviations | | |
|   Bond lengths (Å) | 0.013 | 0.011 |
|   Bond angles (°) | 1.317 | 1.241 |
| MolProbity44 score | 1.20 | 1.38 |
|   Clashscore | 4.12 | 6.99 |
| Ramachandran plot (%) | | |
|   Favoured | 98.82 | 98.82 |
|   Outliers | 0.00 | 0.00 |
| Rotamers (%) | | |
|   Favoured | 97.35 | 96.88 |
|   Poor | 0.53 | 0.52 |
| DPI (Å)45 | 0.011 | 0.015 |

*FIG. 10*

SELF-HEALING MACROMOLECULAR CRYSTAL MATERIALS

CROSS REFERENCE TO RELATED APPLICATIONS

This patent document is a 35 U.S.C. § 371 U.S. National Phase of International Patent Application No. PCT/US2018/060855, filed Nov. 13, 2018, and entitled "SELF-HEALING MACROMOLECULAR CRYSTAL MATERIALS," which claims the benefit of priority U.S. Provisional Patent Application No. 62/585,433, filed on Nov. 13, 2017, and entitled "SELF-HEALING MACROMOLECULAR CRYSTAL MATERIALS," and U.S. Provisional Patent Application No. 62/666,030 filed May 2, 2018, and entitled "SELF-HEALING MACROMOLECULAR CRYSTAL MATERIALS." The entire contents of the before-mentioned patent applications are incorporated by reference as part of the disclosure of this document.

FEDERALLY SPONSORED RESEARCH OR DEVELOPMENT

This invention was made with government support under DE-SC0003844 awarded by the Department of Energy. The government has certain rights in the invention.

TECHNICAL FIELD

The present disclosure relates to hybrid materials, and, in particular, self-healing crystalline materials.

BACKGROUND

Crystalline materials are often brittle and flexible materials often have little molecular structure. New materials are needed that bridge the gap between structured but brittle crystalline materials and flexible materials.

SUMMARY

Materials, compositions of matter, methods, and processes are disclosed. In one aspect a flexible crystal material is disclosed. In one aspect, the flexible crystal material may include a hydrogel polymer. The flexible crystal material may further include a plurality of molecules forming a crystal lattice. The crystal lattice may be mesoporous to the hydrogel polymer. Intermolecular interactions between the plurality of molecules may be self-healing upon expansion and contraction of the crystal lattice due to swelling and deswelling of the hydrogel polymer. The following features may be included in various combinations. The crystal lattice may be configured as a face centered cubic structure. The plurality of molecules forming a crystal lattice may include ferritin. The hydrogel polymer may include poly(acrylate-acrylamide). The swelling and de-swelling (or shrinking) of the hydrogel polymer may be controlled by one or more of an ionic strength and a pH of a solution exposed to the flexible crystal material. The flexible crystal material may swell when exposed to water. The flexible crystal material may de-swell or shrink when exposed to concentrated sodium chloride.

In another aspect, a flexible crystalline material is disclosed that includes a plurality of molecules forming a macromolecular crystal lattice, and a polymer distributed throughout the macromolecular crystal lattice, wherein the polymer changes one or more properties of the macromolecular crystal lattice in response to exposure to a material with one or more selected characteristics.

In another aspect, a flexible crystalline material includes a plurality of molecules forming a macromolecular crystal lattice, and a polymer diffused throughout the macromolecular crystal lattice, wherein when the flexible crystal material is exposed to a first liquid the polymer expands and changes the macromolecular crystal lattice, and when exposed to a second liquid the polymer contracts and the macromolecular crystal lattice is restored.

In another aspect, a flexible crystal material includes a plurality of molecules forming a macromolecular crystal lattice, a polymer permeating throughout the macromolecular crystal lattice, wherein the polymer modulates one or more properties of the flexible crystalline material including one or more of flexibility, robustness. or self-healing when the polymer is exposed to a material with selected characteristics including one or more of an ionic strength, temperature, or pH.

In another aspect, a method of causing a flexible crystal material to swell includes exposing the flexible crystalline material to water, wherein the flexible crystal material includes a protein crystal material and a polymer material, and wherein the water causes a breaking of bonds of the protein crystal with an expansion of the polymer material due to water absorption.

In another aspect, a method of causing a flexible crystal material to deswell, includes exposing the flexible crystalline material to a sodium chloride solution, wherein the flexible crystal material includes a protein crystal material and a polymer material, and wherein the sodium chloride solution causes a contraction of the polymer material due to the removal of water from the polymer. The foregoing method may further include exposing the flexible crystalline material to a calcium chloride solution, wherein the calcium chloride solution causes the flexible crystal material to self-heal to an original set of crystal dimensions.

The following features may be included in various combinations. The one or more properties of the macromolecular crystal lattice may include one or more of flexibility, brittleness, or hardness. The one or more selected properties may include one or more of ionic content, ionic strength, temperature, or pH. The macromolecular crystal lattice and the polymer may be structured so that the exposure to a material with the one or more selected characteristics causes the macromolecular crystal lattice to self-repair damage to a crystal structure. The macromolecular crystal lattice and the polymer may be selected so that intermolecular interactions between the plurality of molecules aid in the movement of subunits to their original locations during deswelling, allowing the macromolecular crystal lattice to self-heal. The polymer may be a hydrogel polymer comprising poly(acrylate-acrylamide). The macromolecular crystal lattice and the polymer may be selected so that, when the flexible crystal material is exposed to water, the hydrogel polymer causes the flexible crystalline material to expand in size. The macromolecular crystal lattice and the polymer may be selected so that, when the flexible crystal material is exposed to a solution including sodium chloride, the hydrogel polymer causes the flexible crystalline material to contract in size. The macromolecular crystal lattice and the polymer may be selected to enable the flexible crystal material to return to one or more original dimensions after the flexible crystal material is exposed to calcium chloride. The polymer may include polymerized monomers which are infused into the macromolecular crystal lattice and subsequently polymerized. The macromolecular crystal lattice may be a protein crystal. The macromolecular crystal lattice may include ferritin. The macromolecular crystal lattice may include amino acids, deoxyribonucleic acid (DNA), or ribonucleic acid (RNA). The flexible crystal material may be capable of repeatedly swelling and deswelling, wherein each time the flexible crystal material deswells, the crystal lattice reforms. The crystal lattice may be configured as a face centered cubic (fcc) structure or another crystal structure. The fcc structure may be characterized by a mesoporous network including cube-shaped chambers that are interconnected by octahedron shaped cavities.

BRIEF DESCRIPTION OF THE DRAWINGS

FIG. 10 depicts a table of example parameters, in accordance with some example embodiments;

DETAILED DESCRIPTION

Figure 1:
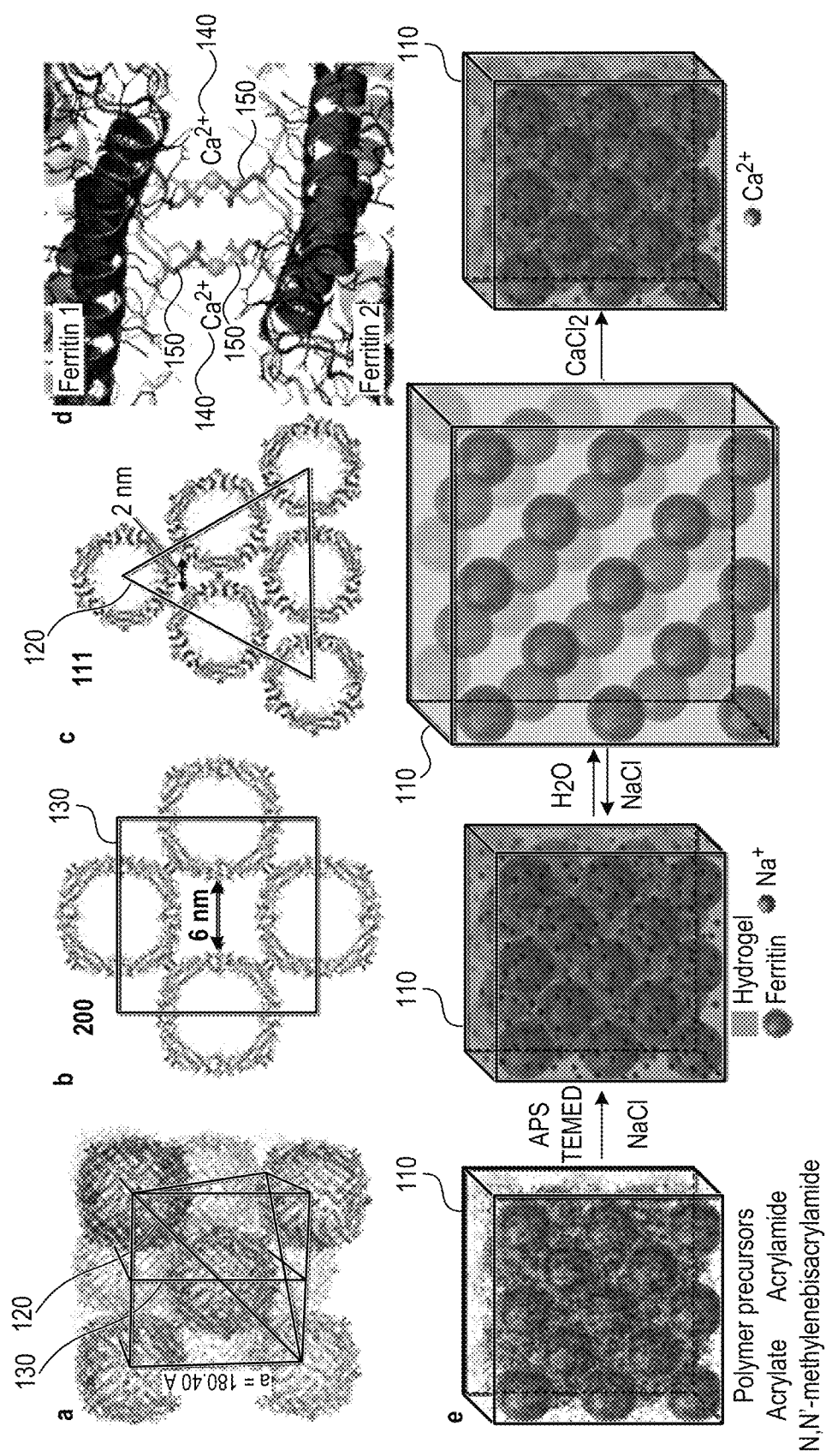
FIG. 1 depicts an example packing arrangement in ferritin crystals and their expansion/contraction, in accordance with some example embodiments.

The disclosed subject matter includes hybrid materials including molecular/protein crystals integrated with synthetic polymers. These materials combine the structural order and periodicity of crystals, the adaptiveness and tunable mechanical properties of polymeric networks, and the chemical versatility of protein building blocks.

Disclosed are mixtures materials that create a hybrid form of crystalline matter that combines protein crystals with synthetic polymers to create hybrid materials. The integration of two substances circumvents the fundamental limitation that ordered substances are brittle and inflexible, and flexible materials are devoid of order.

Crystals are arrays of atoms or molecules periodically ordered in three-dimensional space through specific interactions. These interactions hold the neighboring constituents in a unique arrangement, crystals—like grains of salt, for example—cannot flex or expand. If hit by a blunt force, they shatter into pieces which cannot rejoin. As disclosed herein, the foregoing limitations can be circumvented by infusing protein crystals with a network of hydrogel polymers, which are essentially floppy, sticky chains that form a shape-memory mold around the protein molecules. This mold enables the protein crystals to heal themselves when they crack, as well as to expand (e.g., by up to 500 percent in volume or more) and contract without losing their crystallinity. In some example embodiments, the atomic-level order of the protein molecules may be increased upon expansion and contraction. The increased order may enable higher-resolution structures for a protein such as ferritin using x-ray radiation.

Crystal-hydrogel hybrid materials are examples of simultaneously tough and strong materials that can withstand fracture. Expansion and contraction may be used to store large biological agents like antibodies and nucleic acids, and then to release them in desired locations in the body for therapeutic purposes. The disclosed materials combine the structural order and periodicity of molecular crystals, the adaptiveness and tunable mechanical properties of synthetic polymers, and the chemical versatility of protein building blocks.

Some of the properties of the disclosed materials include the following: 1) allows crystals—which are typically rigid and brittle—to expand and contract reversibly; 2) incorporates polymers to increases the mechanical toughness of the crystals and allow self-healing; 3) reversibly expand/contract crystal lattices and mobilize the protein components therein may provide a new means to improve X-ray diffraction quality and explore otherwise inaccessible protein structural states using 3D protein crystallography; 4) creation of chemically and mechanically differentiated domains within single crystals. Some example embodiments combine the properties of hydrogels (flexibility, adaptability, elasticity, self-healing), crystals (structural order) and proteins (chemical and genetic tailorability).

Formation of condensed matter typically involves a trade-off between structural order and flexibility. As the extent and directionality of interactions between atomic or molecular components increase, materials generally become more ordered but less compliant and vice versa. Yet, high levels of structural order and flexibility need not be mutually exclusive. The extent of structural flexibility and, particularly, expandability is restricted by the continuous bonding network between the molecular constituents of the lattice. An aspect of the disclosed subject matter includes macromolecular ferritin crystals with integrated hydrogel polymers can isotropically expand their original dimensions and their original volume while retaining periodic order and faceted Wulff morphologies. For example, in some example embodiments, macromolecular ferritin crystals with integrated hydrogel polymers may expand to 180% of their original dimensions and >500% of their original volume. After the separation of neighboring ferritin molecules by, for example, 50 Å upon lattice expansion, specific molecular contacts between them can be reformed upon lattice contraction, resulting in the recovery of atomic-level periodicity. Dynamic bonding interactions between the hydrogel network and the ferritin molecules endow the crystals with the ability to resist fragmentation and self-heal efficiently, while the chemical tailorability of the ferritin molecules enables the creation of chemically and mechanically differentiated domains within single crystals.

A material consistent with some disclosed embodiments may be created by soaking crystals of human ferritin, an iron-storage protein, in a NaCl solution of hydrogel precursors. As the poly(acrylate-acrylamide) copolymer hydrogel forms, it integrates into void spaces in the protein crystal. The hydrogel and protein link to one another via ionic and hydrogen-bonding interactions, forming a true hybrid, not just a mixture. Placing the hybrid in deionized water eliminates NaCl and causes the material to expand to, for example, double (or another factor) its original linear dimensions and may expand to over five times (or another factor) its original volume. Adding NaCl dehydrates the hybrid, contracting it to nearly its original size. Adding $CaCl_2$ instead of NaCl promotes interactions between ferritin molecules even more effectively, returning the hybrid to its original dimensions. X-ray diffraction of demonstrated full recovery of crystalline periodicity and was the highest resolution ferritin structure reported.

The lattices of the disclosed hybrids may be more ordered than those of conventionally produced ferritin. Polymer infusion may be a useful for improving the quality of other protein structures, or to access alternative structural states of proteins. The technique is applicable to other proteins other than ferritin. Diverse hybrid materials can be created by modifying and functionalizing the constituent proteins in various ways.

In some implementations, NaCl-mediated contraction may be reversible. Ca ions (which are 2+ charged) may bind more strongly to the polymer matrix which may cause Ca-mediated contraction to be quasi-irreversible. If the samples are soaked long enough in pure water, the Ca ions may eventually leach out leading to expansion.

Consistent with some example embodiments are hydrogel polymers that lack structural order, but are highly elastic and adaptive, can expand considerably, and self-heal when equipped with dynamic bonding functionalities. The isotropic swelling-deswelling behavior of hydrogels may be leveraged to modulate the lattice spacing of colloidal nanoparticle arrays, and to expand biological tissue samples for facilitating high-resolution fluorescence imaging.

Consistent with some example embodiments are molecular crystals with the mechanical properties of hydrogels. For example, crystal lattices that are formed by discrete molecules that are connected via specific bonding interactions and may be mechanically modulated through the integration of polymeric hydrogels. In some example embodiments, the hydrogel-expandable molecular crystals, may have one or more of the following properties: 1) mesoporous lattices to enable the hydrogel network to penetrate efficiently and uniformly into the crystals; 2) intermolecular interactions between the constituents of the lattices that are reversible and chemically specific (i.e., contain directional and dynamic bonds), such that they disengage with ease during expansion and re-engage with high fidelity upon contraction; 3) interactions between the constituents of the lattice and the hydrogel network that are extensive that maintain the integrity of the crystal-polymer hybrid and sufficiently dynamic to minimize the build-up of local strain and to enable self-healing.

Consistent with one or more of the foregoing parameters are hybrid materials including ferritin crystals integrated with the superabsorbent poly(acrylate-acrylamide), or p(Ac-Am), copolymer hydrogels, whose swelling-deswelling behavior can be modulated by ionic strength and pH. Ferritin has one or more of the following characteristics: is a 24-meric, quasi-spherical protein with 432 symmetry, an outer diameter of 12 nm, an inner diameter of 8 nm, and a molecular weight of >500,000 Da. Human heavy-chain ferritin forms highly ordered, face-centered cubic (fcc) crystals that grow to >200 µm in size and diffract to <2.0 Å. The fcc lattice (FIG. 1a) is characterized by a mesoporous network consisting of cube-shaped, 6-nmwide chambers (FIG. 1b) that are interconnected by smaller, octahedron-shaped cavities that taper to a pore size of about 2 nm at their narrowest (FIG. 1c) (property 1 above). The lattice is formed through highly specific, metal-mediated contacts between neighboring ferritin molecules (FIG. 1d), which are promoted through the K86Q surface mutation to enable metal coordination. The absence of any other interprotein contacts means that the lattice bonding framework of ferritin molecules can be formed or broken via binding or removal of metal ions (e.g., $Ca^{2+}$), satisfying (property 2 above). Finally, ferritin bears a small negative charge, with a zeta potential ranging from −5.5 mV at pH 6.0 to −7.3 mV at pH 7.5 (FIG. 2a). The exterior surface of ferritin presents a diffuse distribution of both negatively and positively charged residues (FIG. 2c), which should enable uniform association with the p(Ac-Am) network through a combination of ionic and H-bonding interactions, thus fulfilling property 2 above (FIG. 1e).

Figure 2:
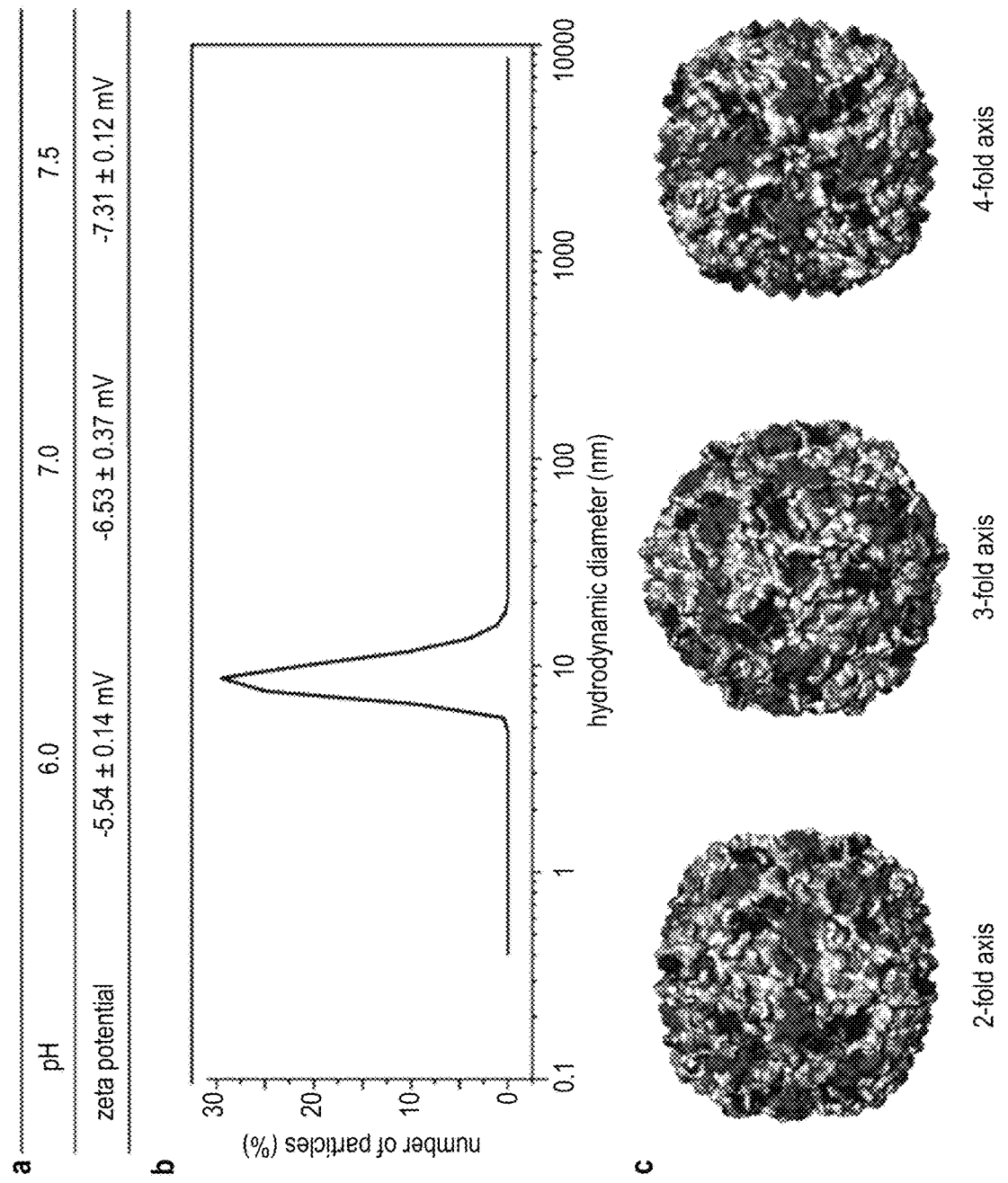
FIG. 2 depicts an example distribution of electrostatic charge on the surface of ferritin, in accordance with some example embodiments.

FIG. 1 depicts a packing arrangement in ferritin crystals and their expansion/contraction mediated by the infused hydrogel network. FIGS. 1a-1c depict a face centered cubic packing arrangement of ferritin crystals. The unit cell, the 200 plane and the 111 plane are shown as lines 110, lines 130, and lines 120, respectively. FIG. 1d depicts Ca-mediated intermolecular interactions between ferritin molecules in the lattice. Ca2+ ions 140 are coordinated by two pairs of D84 and Q86 sidechains 150. FIG. 1e depicts a schematic representation for the formation, expansion, and contraction of ferritin crystal-hydrogel hybrids.

Figure 3:
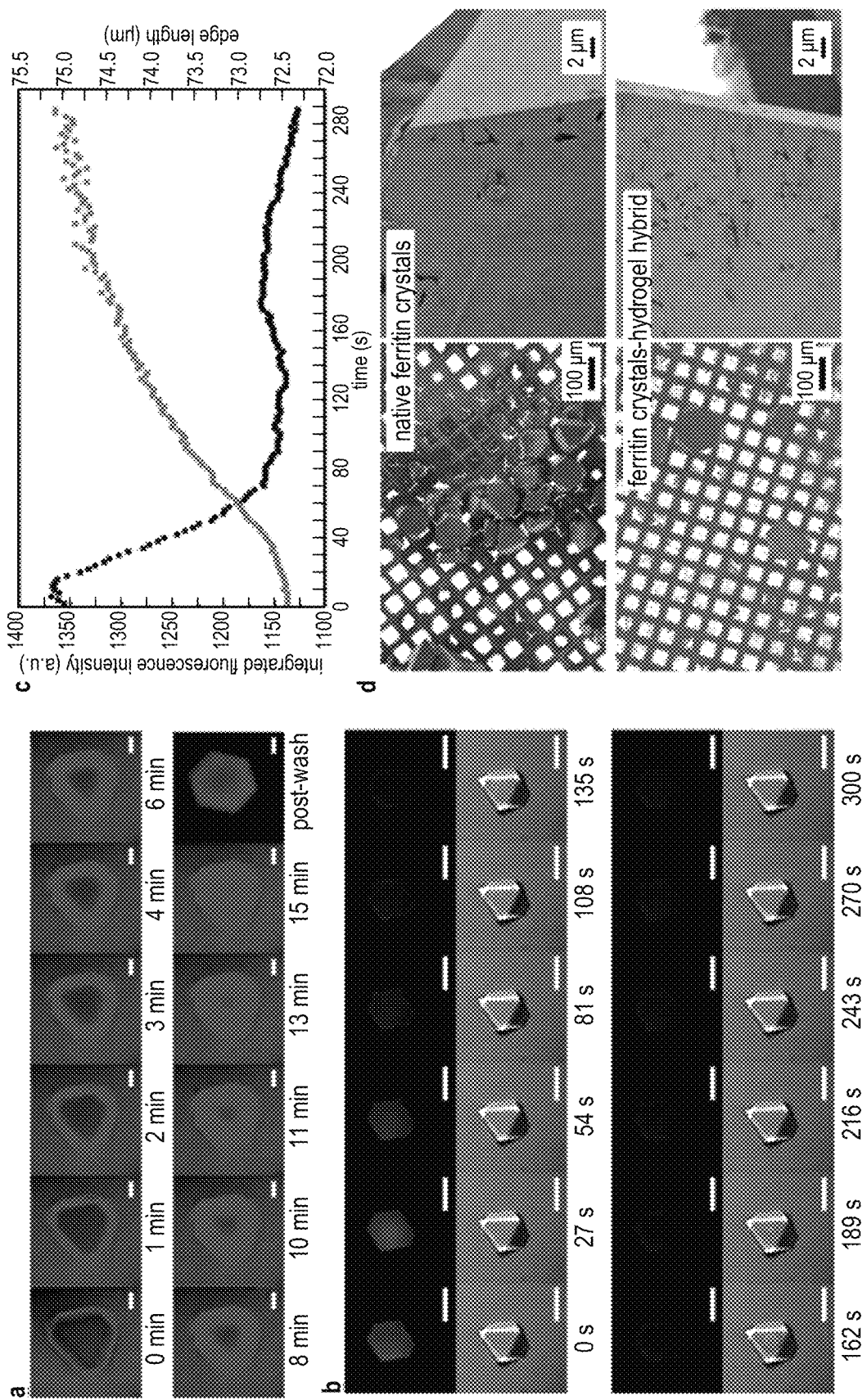
FIG. 3 depicts an example of molecular diffusion and polymerization in ferritin crystals monitored by confocal microscopy, in accordance with some example embodiments.

The disclosed subject matter explored efficiency of molecular diffusion and polymerization within ferritin crystals. Diffusion into single ferritin crystals may be assessed using the fluorescent tracer Rhodamine B by confocal fluorescence microscopy, which showed that a crystal (edge length, $l_{edge}$=50-250 µm) was completely infiltrated by the tracer within 15 min (FIG. 3a). In a preparation of crystal-hydrogel hybrids, ferritin crystals were incubated with polymer precursors (8.625% (w/v) sodium acrylate (NaAc), 2.5% acrylamide (Am), 0.2% N,N'-methylenebis(acrylamide)) (MBAm) for at least 10 h to ensure their uniform distribution in the lattice interstices; this treatment causes no damage to the crystals. Crystals were may then be transferred into a solution containing 1% (w/v) ammonium persulfate (APS) and 1% (v/v) tetramethylethylenediamine (TEMED) to initiate free-radical polymerization within the lattice and 4 M sodium chloride (NaCl) to limit swelling during polymerization (FIG. 1e). In order to assess the kinetics of polymerization inside the crystals, 0.3% (w/v) 8-hydroxypyrene-1,3,6-trisulfonic acid (pyranine) may be added to the aforementioned co-monomer mixture. Pyranine may covalently incorporate into the polymer backbone upon radical-mediated crosslinking and undergo a shift in its emission maximum from 512 to 420 nm Thus, the extent of in-crystallo polymerization may be monitored by the decrease of green fluorescence intensity (emission wavelength, $\lambda_{emission}$=500-550 nm; excitation wavelength, $\lambda_{excitation}$=488 nm), indicating that hydrogel formation is complete in <2 min for a crystal with $l_{edge}$=70 μm (FIG. 3b, 3c; see FIG. 16B for polymer quantification via 19F nuclear magnetic resonance, NMR). Polymerization may be followed by the intrusion of the aqueous NaCl solution into the crystal-hydrogel matrix, which may be clearly visualized due to the difference between the refractive indices of the salt solution ($n_D$=1.3676) and the matrix ($n_D$≈1.34) (FIG. 3b, 3c). The solvent permeation process typically finished within 10 min and may be accompanied by a small but noticeable enlargement of the crystals (≤5% increase in edge length) (FIG. 3C).

Figure 4:
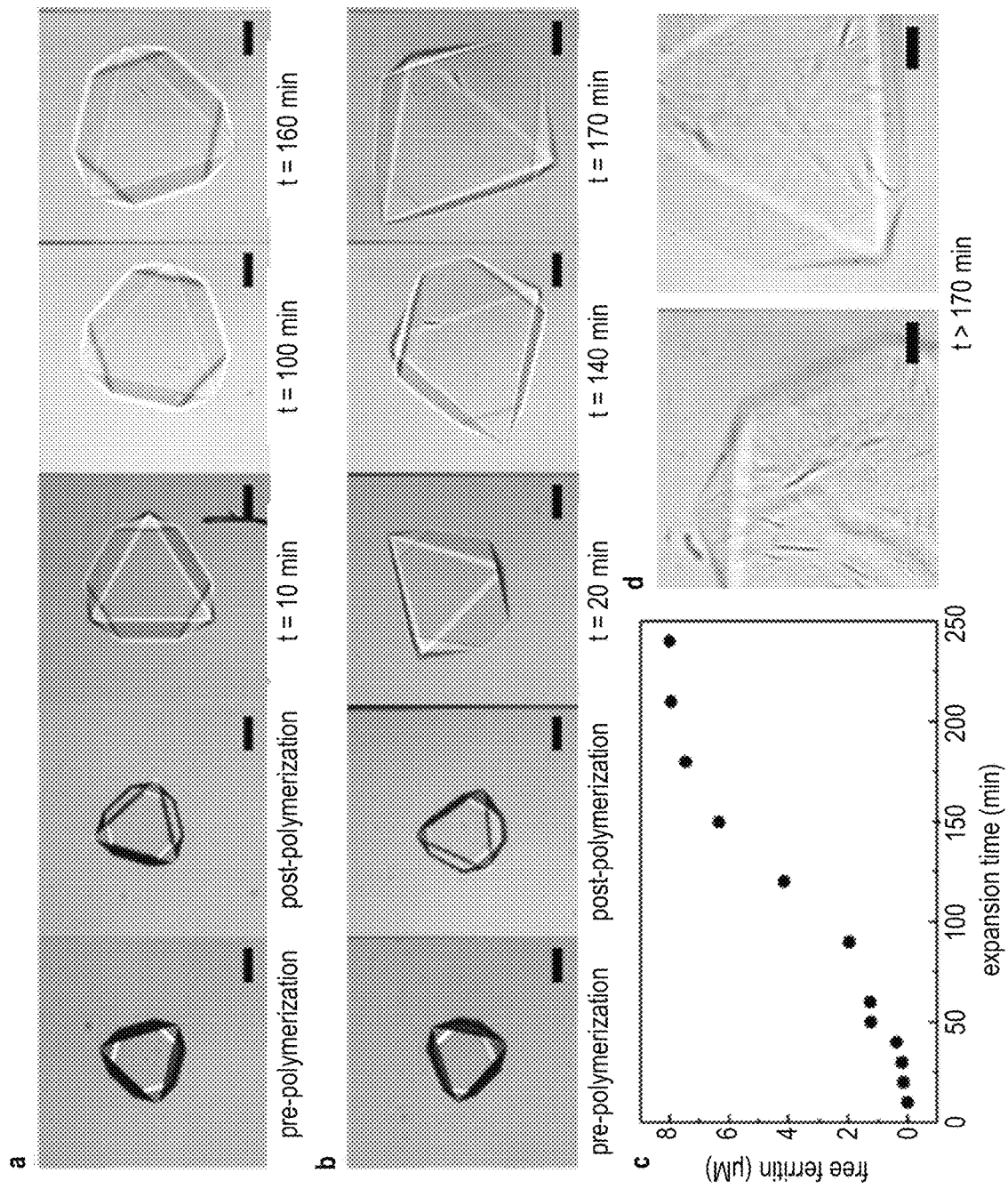
FIG. 4 depicts an example of isotropic hyperexpansion of ferritin crystal-hydrogel hybrids, in accordance with some example embodiments.

Full expansion of hydrogel-infused ferritin crystals may be initiated by placing them in deionized water. As monitored by light microscopy, the expansion of the crystals may be isotropic and their faceted, polyhedral morphologies may be preserved even after they grew to ≥210% of their original dimensions (FIG. 5a, see also FIGS. 4a and 4b for additional examples), often without the appearance of any defects. The expansion kinetics may be biphasic with $\tau_{fast}$<100 s and $\tau_{slow}$>>300 s (FIG. 5a). Isotropic growth may continue until the edges of the materials were not discernable, but we typically stopped the process after <10 min when considerable expansion had may already have occurred. No significant liberation of ferritin molecules from the lattices may be evident during the first 50 min of expansion (FIG. 4c). Addition of a concentrated monovalent salt (e.g., NaCl or KCl) may lead to rapid dehydration and isotropic contraction of the expanded crystals to nearly their original size (FIG. 5a). Recovery of the original crystal dimensions may be achieved by further addition of $CaCl_2$, owing to the dual ability of $Ca^{2+}$ to more effectively screen the negatively charged polymer backbone and to re-engage the specific interactions between ferritin molecules. The expansion/contraction cycle may be repeated several times without apparent loss in amplitude and change in crystal morphology when a monovalent metal-salt solution (e.g., NaCl) was used for inducing contraction (FIG. 6). Crystals contracted with $CaCl_2$ may have a smaller expansion owing to the enhanced strength of the polymer network and protein—protein interactions. In some control experiments, other hydrogel formulations, including those that only contained polar but non-charged functional groups (pAm or poly-tris(hydroxymethyl)methyl(acrylamide)) or non-polar side chains (poly-N-isopropylacrylamide) (FIG. 7) were tested. These polymers led to either dissolution or disintegration of crystals after initiation of in crystallo polymerization.

Figure 5:
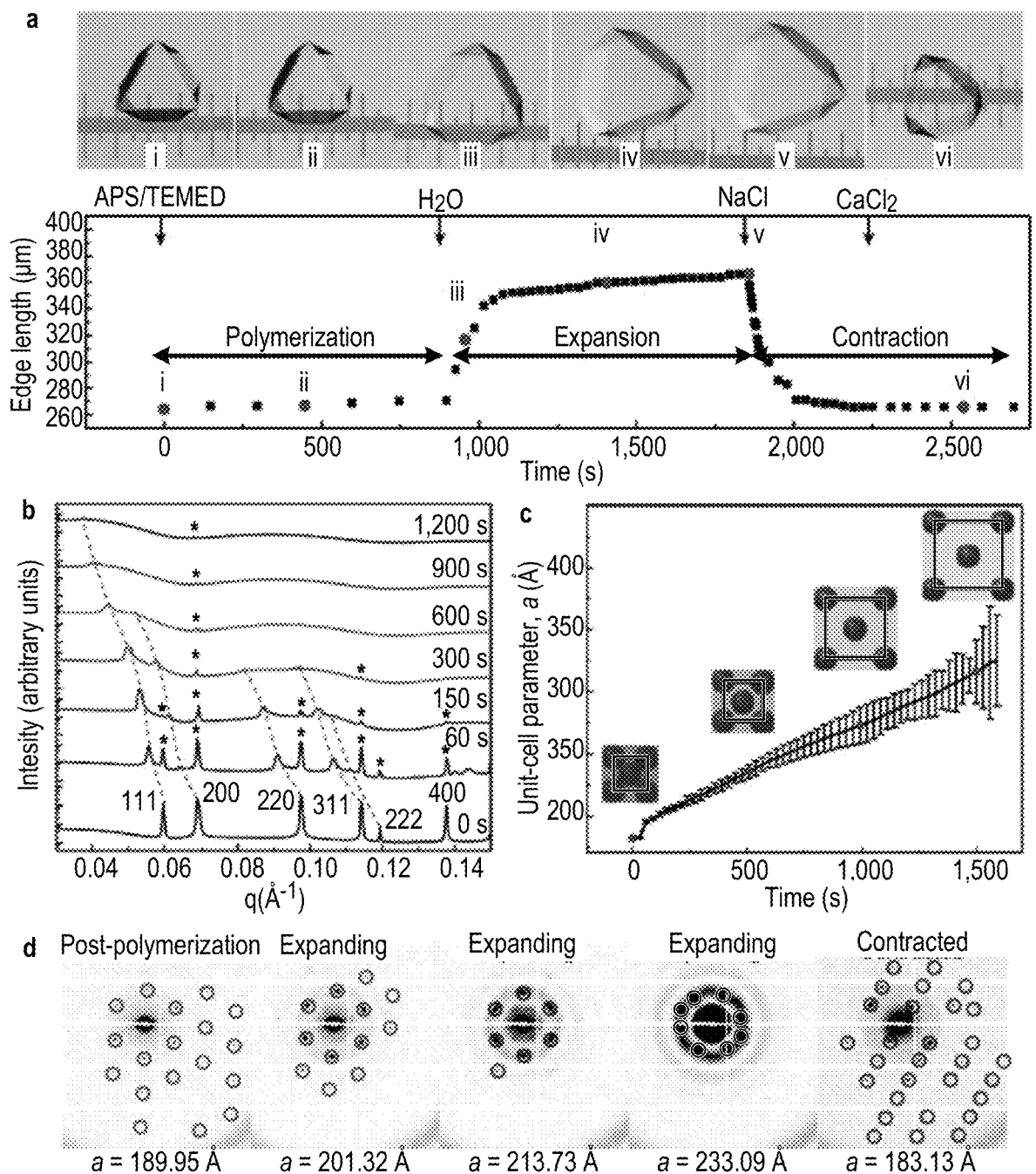
FIG. 5 depicts an example of expansion and contraction behavior of ferritin crystal-hydrogel hybrids, in accordance with some example embodiments.
Figure 6:
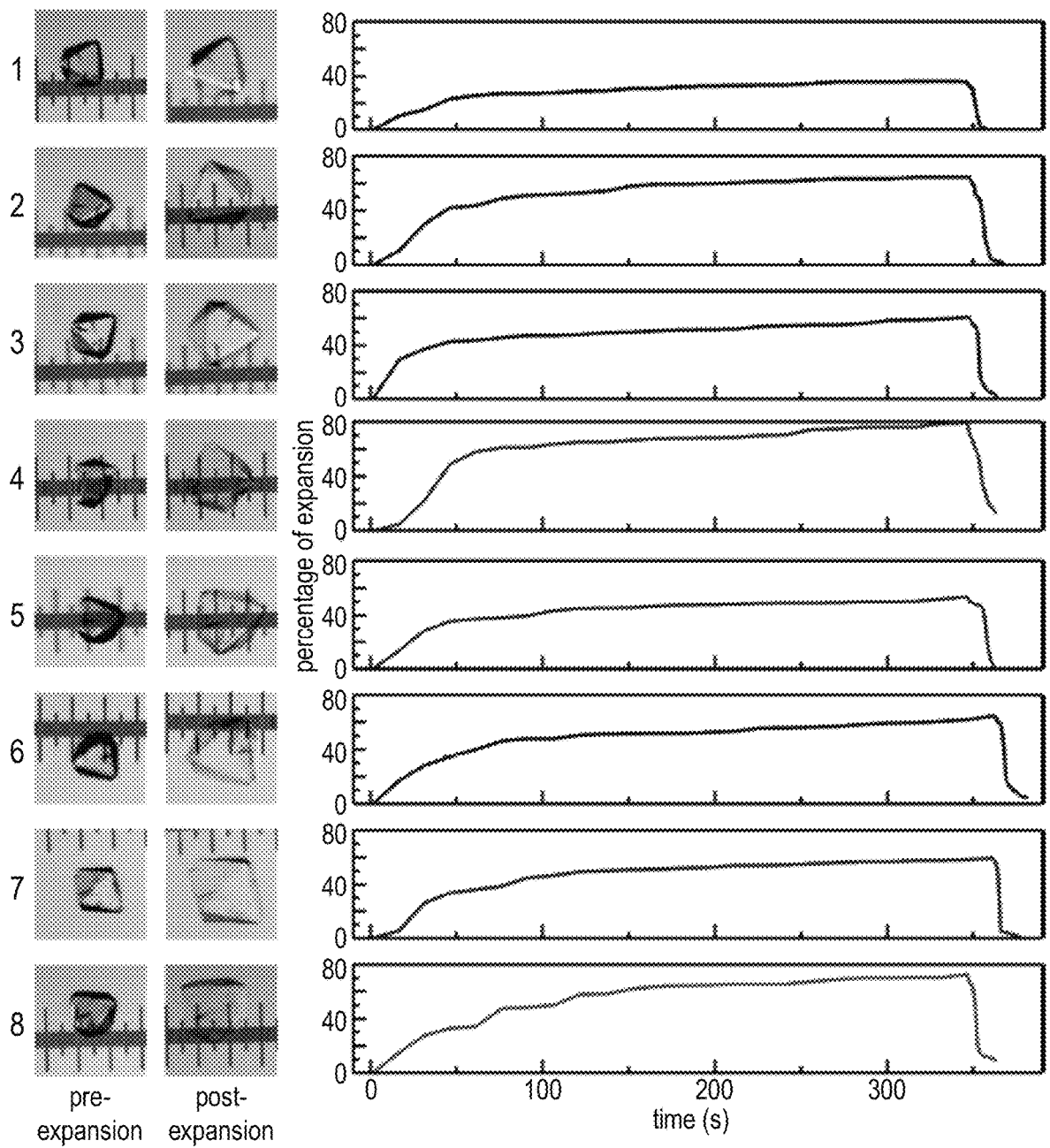
FIG. 6 depicts an example of successive expansion/contraction cycles for a single ferritin crystal-hydrogel hybrid, in accordance with some example embodiments.
Figure 7:
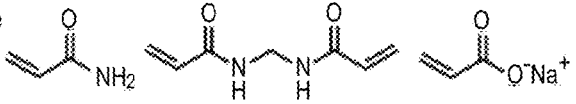
FIG. 7 depicts examples of alternate hydrogel formulations, in accordance with some example embodiments.

FIG. 5 depicts an example characterization of the expansion and contraction behavior of ferritin crystal-hydrogel hybrids. FIG. 5a depicts a structural evolution of a ferritin crystal-hydrogel hybrid during the polymerization-expansion-contraction process, as monitored by light microscopy. The separation between the major ticks of the ruler is 100 μm. FIG. 5b depicts an evolution of the SAXS profile of hydrogel-infused ferritin crystals (n>100) during lattice expansion. The progression of scattering peaks to lower angles during contraction is indicated with grey dashed lines. Peaks corresponding to the original lattice parameters (designated with asterisks) are visible throughout the process, indicating that some of the crystals in the bulk sample do not expand, may be due to limited solvent diffusion or incomplete polymerization. FIG. 5c depicts changes in unit cell parameter a during lattice expansion calculated from SAXS profiles shown in FIG. 5b. Cartoon representation of the expanding lattice is drawn to scale. Uncertainties in a were determined from the FWHMs (full-width at half maximum) of the scattering peaks. FIG. 5d depicts an example of expansion and contraction of a single crystal monitored by SAXS. For Bragg reflection assignments, see FIG. 8.

pAc hydrogels are capable of promoting isotropic expansion of the crystals in the absence of Am co-monomers (FIG. 7), implicating carboxylate sidechains as the mediators of interactions with ferritin molecules. In contrast, treatment of ferritin crystals with pre-formed pAc polymers, which cannot diffuse into the lattice, may lead to crystal dissolution upon transfer into water (FIG. 7c). Taken together, these observations confirm that 1) there are extensive non-covalent interactions between ferritin molecules and the p(Ac-Am) hydrogel matrix which preserve the structural integrity of even highly expanded crystals, and 2) the hydrogel matrix continuously and uniformly pervades the entire lattice, thus promoting cooperative transmission of any lattice deformations to enable isotropic expansion/contraction.

The expansion/contraction-related changes in the lattice arrangement of ferritin molecules may be revealed using small-angle X-ray scattering (SAXS). FIG. 5b shows the evolution of the "powder" SAXS pattern of >100 single p(Ac-Am)-infused crystals suspended in solution and undergoing expansion. The spectrum of the unexpanded crystals is indicative of an fcc lattice with a unitcell parameter a=182.40 Å. The isotropic growth of the unit cell is evident from the correlated shifts of the Bragg peaks to lower angles. The decay of the higher-angle peaks may be considerably more rapid and paralleled by the emergence of the ferritin form factor. This is consistent with the picture that, as the crystal expands, the hydrogel matrix becomes less dense around the ferritin molecules, leading to their increased mobility. Yet, the (111) reflection is still evident after 20 min of expansion, meaning that long-range periodic order is still present when the unit cell has grown to a=325 Å (FIG. 5c) and the volume of the material has increased to 570% of its original value.

Figure 8:
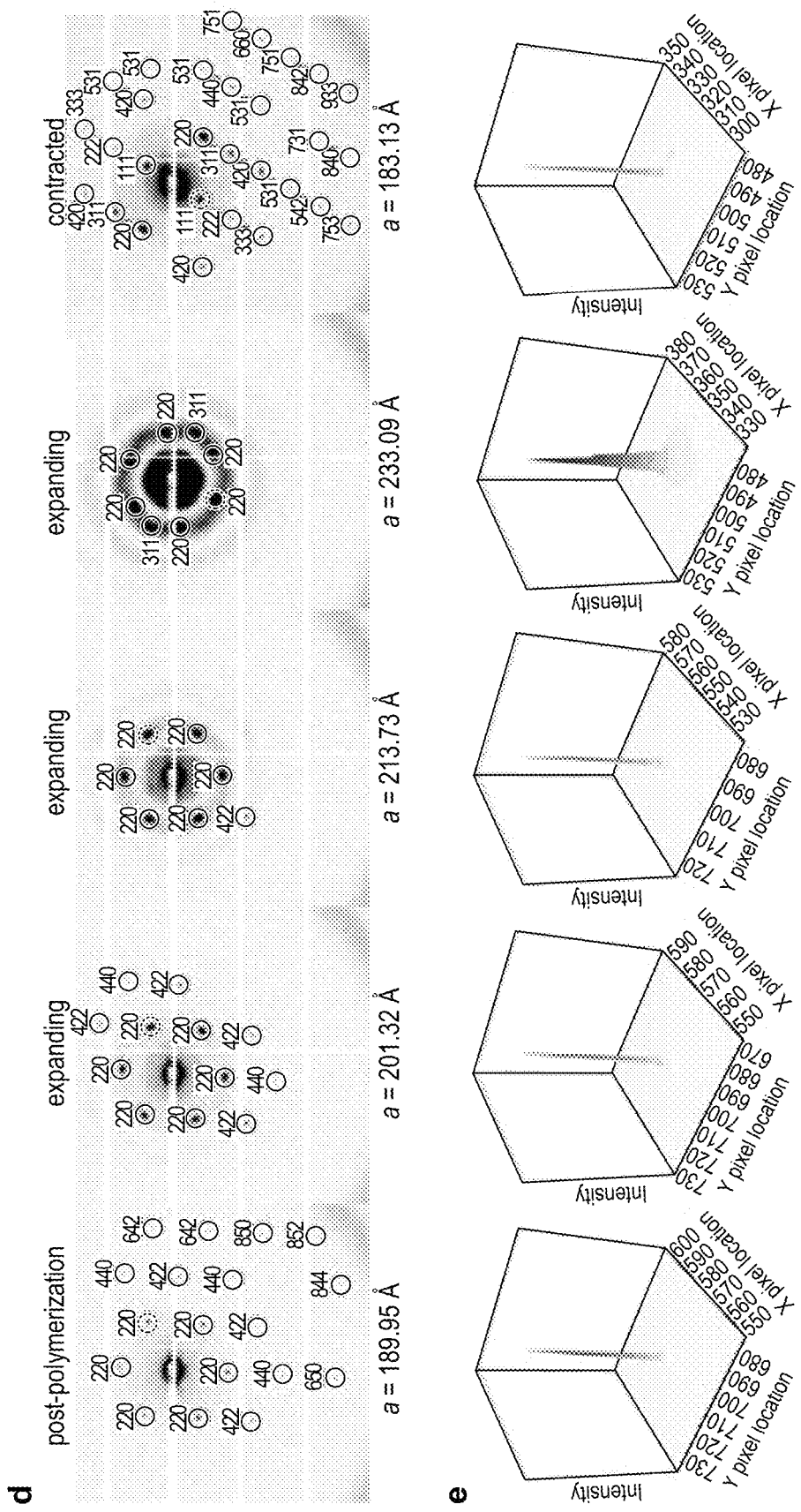
FIG. 8 depicts an example of a small-angle x-ray scattering (SAXS) of a single crystal-hydrogel hybrid, in accordance with some example embodiments.
Figure 14:
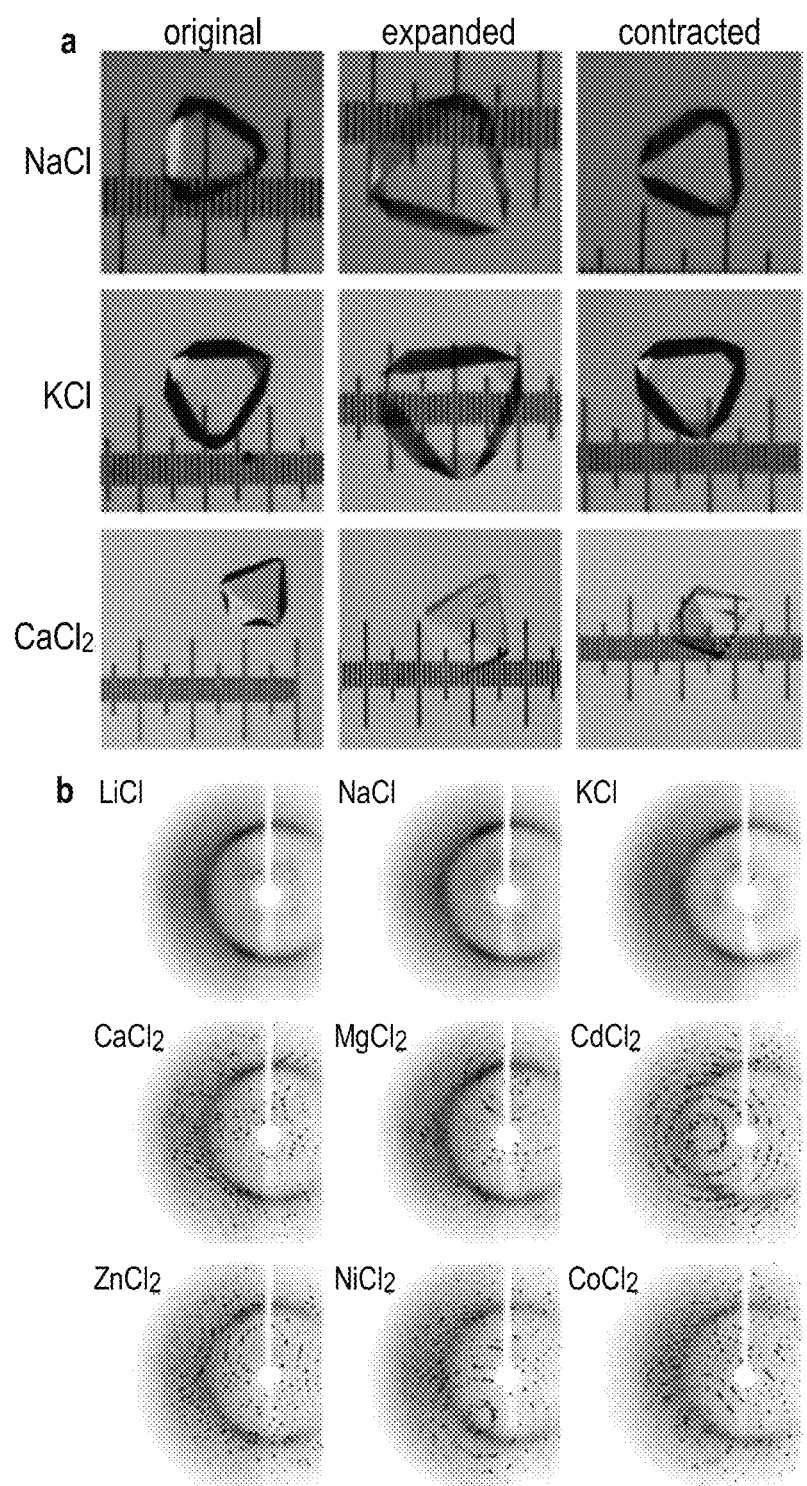
FIG. 14 depicts an example of expansion and contraction of a crystal-hydrogel hybrid in the presence of different metal ions, in accordance with some example embodiments.

In order to determine the reversibility of lattice expansion, a microfluidic flow cell may be used for single-crystal SAXS testing (FIG. 8). This may circumvent the inherent issues associated with bulk measurements (e.g., sample heterogeneity, inefficient solvent diffusion). SAXS data in FIG. 5d indicate that a single crystal lattice, which has expanded by 27% corresponding to a separation of 35 Å between neighboring ferritin molecules—can return to its original dimensions upon NaCl/CaCl2-induced contraction. To examine whether the recovery also takes place at the level of atomic periodicity, high-angle, single-crystal X-ray diffraction (XRD) experiments may be conducted at room temperature (FIG. 9a-c). These experiments showed that crystals that expanded by up to 40% could fully regain their native diffraction pattern upon contraction with divalent metal-ion salts (FIG. 14b). With such expanded and Ca-contracted crystals, sub-1.15 Å resolution datasets may be consistently obtained at a synchrotron source at 100 K (FIG. 10: Table 1). The resulting crystal structures revealed two different conformational states of the $Ca^{2+}$-bridged ferritin-ferritin interfaces (FIG. 9d): about 60% of the interfaces were found in the native configuration (as shown in FIG. 1d, but with a well resolved Ca-coordinated water molecule), whereas the remaining 40% presented an alternative coordination mode for $Ca^{2+}$, likely stemming from lattice rearrangements during contraction. Notably, the 1.06-Å resolution crystal structure (R-factors, $R_{work}$=9.10%; $R_{free}$=10.26%; estimated coordinate error dispersion precision indicator (DPI)=0.011 Å) represents highest-resolution ferritin structure reported to date. Hydrogel infusion and the expansion-contraction process may not diminish X-ray diffraction (XRD) quality and may actually improve it; which may be due to the reduction of protein motions by the hydrogel matrix in the contracted state. In FIG. 10, the numbers in parentheses correspond to the highest resolution shell. Rmerge and CC ½ are measurements used to determine an appropriate high-resolution limit for XRD data.

Figure 9:
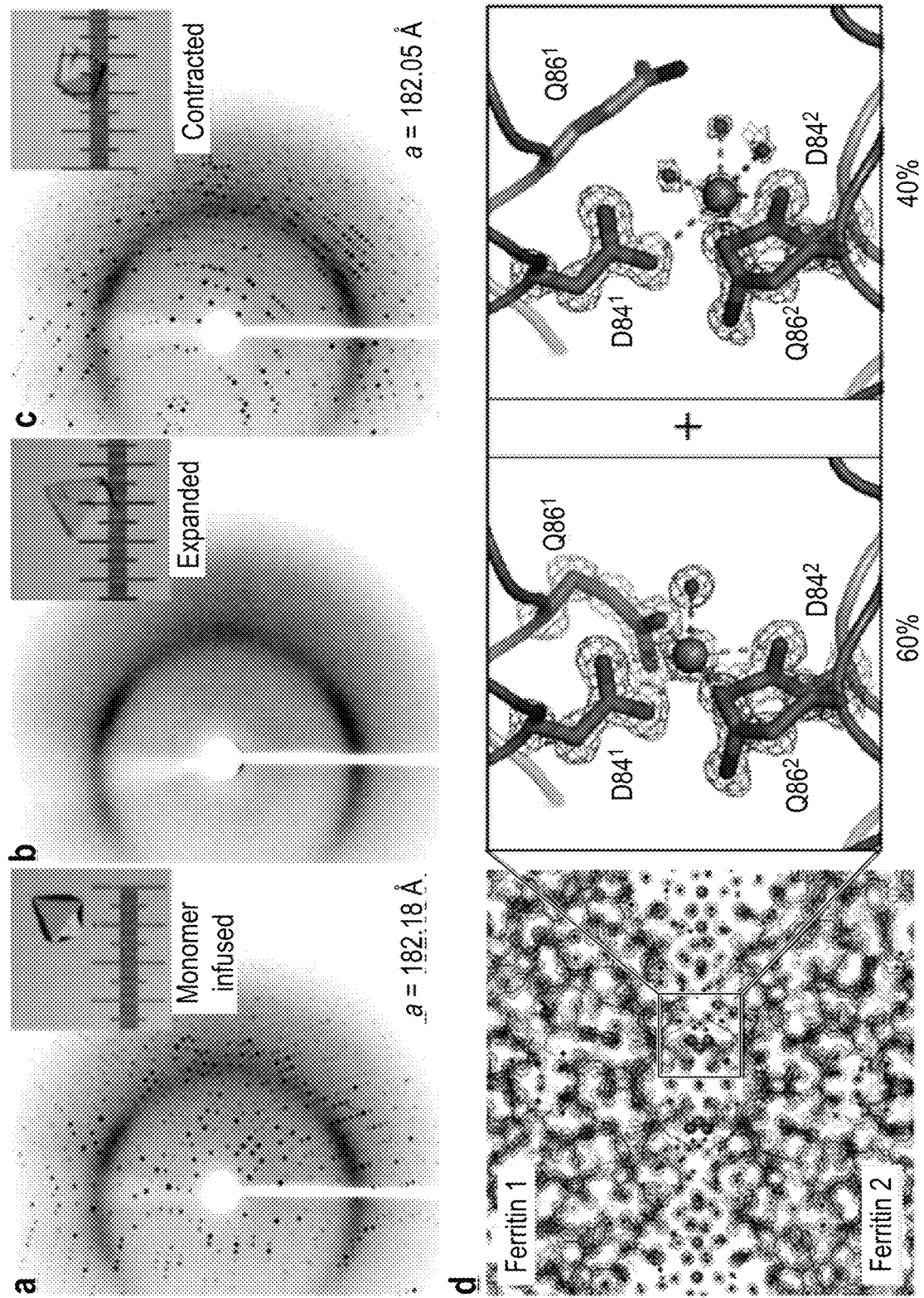
FIG. 9 depicts high-angle X-ray diffraction by ferritin crystal-hydrogel hybrids, in accordance with some example embodiments.

FIG. 9 depicts high-angle X-ray diffraction by ferritin crystal-hydrogel hybrids. FIG. 9a depicts an example of X-ray diffraction patterns (at temperature T=293 K) of a ferritin crystal infused with polymer precursors. FIG. 9b depicts after polymerization and expansion. FIG. 9c depicts after contraction with $CaCl_2$. Light micrographs of the crystal are shown in the insets; the separation between the major ticks of the ruler is 100 μm. FIG. 9d depicts an example of 1.06-Å resolution crystal structure (T=100 K; PDB ID, 6B8F) of the contracted ferritin crystal-hydrogel, showing the electron density surrounding the Ca-mediated ferritin-ferritin interfaces and highlighting the two observed Ca coordination conformations. The electron density ($2F_o$-$F_c$) map (gray) is contoured at 1.5σ. Water molecules are shown at 910 and Ca ions are shown at 920.

Figure 15:
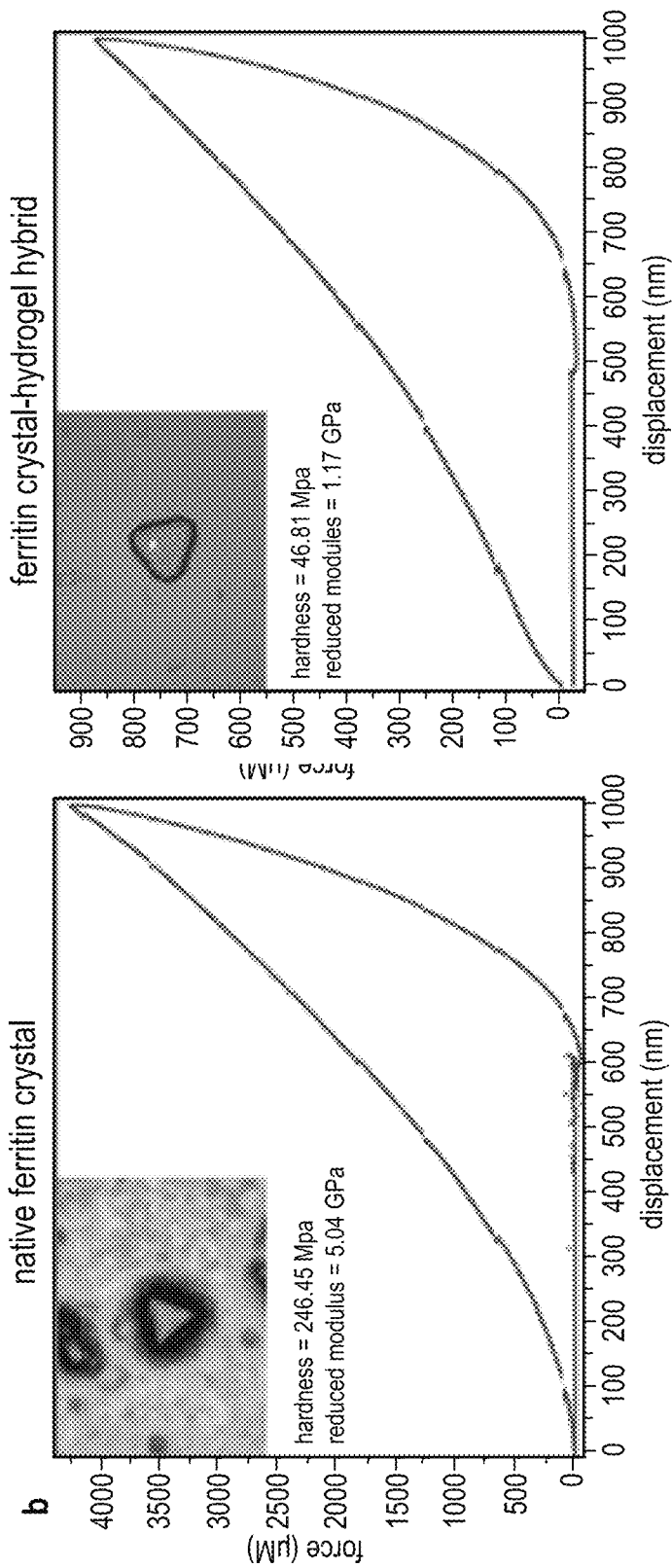
FIG. 15 depicts an example of temperature dependences of the SAXS profiles or native ferritin crystals and crystal-hydrogel hybrids, in accordance with some example embodiments.
Figure 16A:
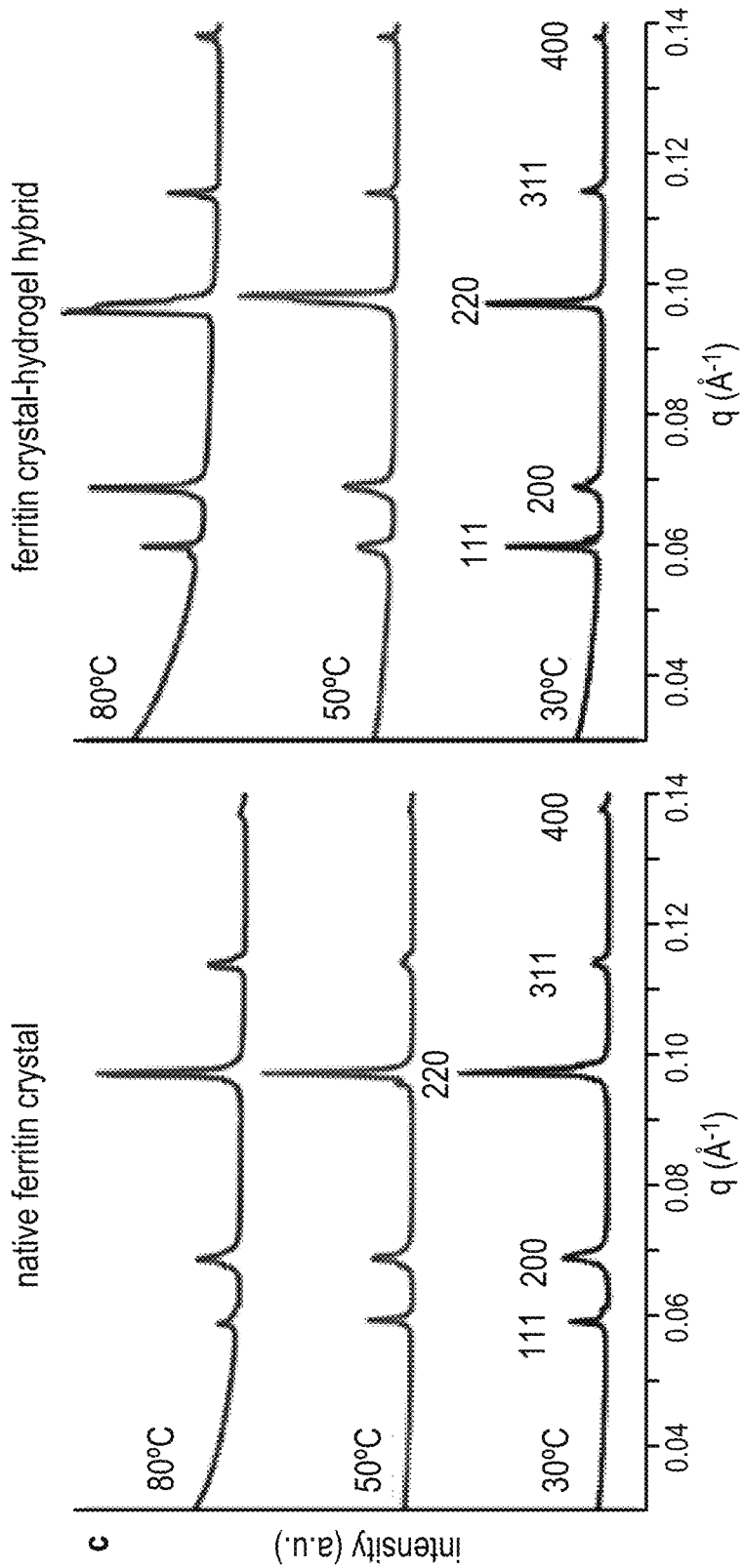
FIG. 16A depicts an example of the hardness and reduced modulus of native ferritin crystals and crystal-hydrogel hybrids, in accordance with some example embodiments.

Any local anisotropy developed during the expansion or contraction of the hydrogel matrix would be expected to cause dislocations in the embedded ferritin lattice. Exposure of hydrogel-infused crystals to rapid changes or temporary spatial gradients in NaCl or $CaCl_2$ concentrations may lead to fracturing (see, for example, FIG. 9b inset). Yet, these materials are self-healing, whereby the cracks were spontaneously, and in some cases, scarlessly sealed (FIG. 11a, b), owing to the reversible bonding interactions of the hydrogel network with the protein molecules (FIG. 11c). Covalently crosslinked hydrogels like p(Ac-Am) do not typically self-heal unless they are modified with dynamic bonding functionalities. In the case of the disclosed materials, the role of such functional groups is fulfilled by the ferritin molecules, which act as interaction hubs for polymer chains. During expansion/contraction cycles, cracks tended to occur in the same loci in a given crystal. This observation suggests that the healed interfaces have not fully regained the original hydrogel crosslinking density of the bulk material, at least in the time scale (several min) of the experiments. Hydrogel integration substantially mitigates the brittleness of native ferritin crystals (FIG. 12). FIG. 12 depicts examples of light-microscopy images showing the fragmentation of a native ferritin crystal and of a crystal-hydrogel hybrid upon application of external force with a needle at the location indicated with the arrow. The separation between the major ticks of the ruler is 100 μm. No fragmentation occurs even in cases of substantial fracturing that propagated throughout the crystals, and fissures as wide as 20 μm could be closed to recover near-native crystal morphology (FIG. 11b). The ferritin crystal-hydrogel hybrids had a reduced modulus of about 1 GPa, which is similar to that of ferritin crystals (FIG. 15), but several orders of magnitude higher than those of hydrogels. FIG. 15 depicts en example of temperature dependence of the SAXS profiles of native ferritin crystals and crystal-hydrogel hybrids. The small-angle reflections (that is, periodic order) in both samples are maintained at 80° C. (the maximal temperature experimentally attainable). The hybrids are also highly thermostable, maintaining their crystalline order at ≥80° C. (FIG. 16A). FIG. 16A depicts an example of the determination of the hardness and reduced modulus of native ferritin crystals and crystal-hydrogel hybrids using atomic force microscopy nanoindentation measurements.

Figure 11:
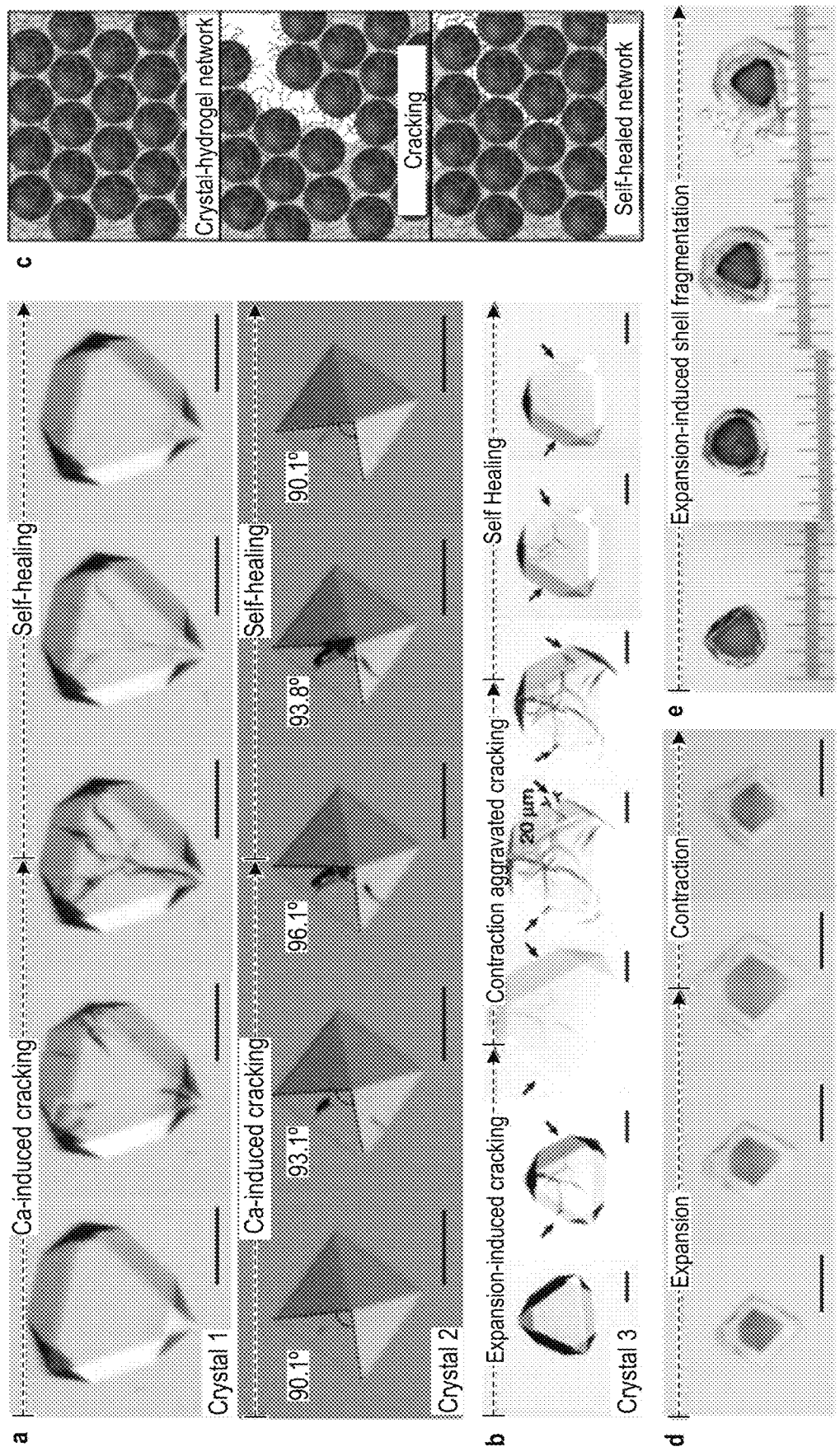
FIG. 11 depicts an example of self-healing and functionalization of ferritin crystal-hydrogel hybrids, in accordance with some example embodiments.
Figure 12:
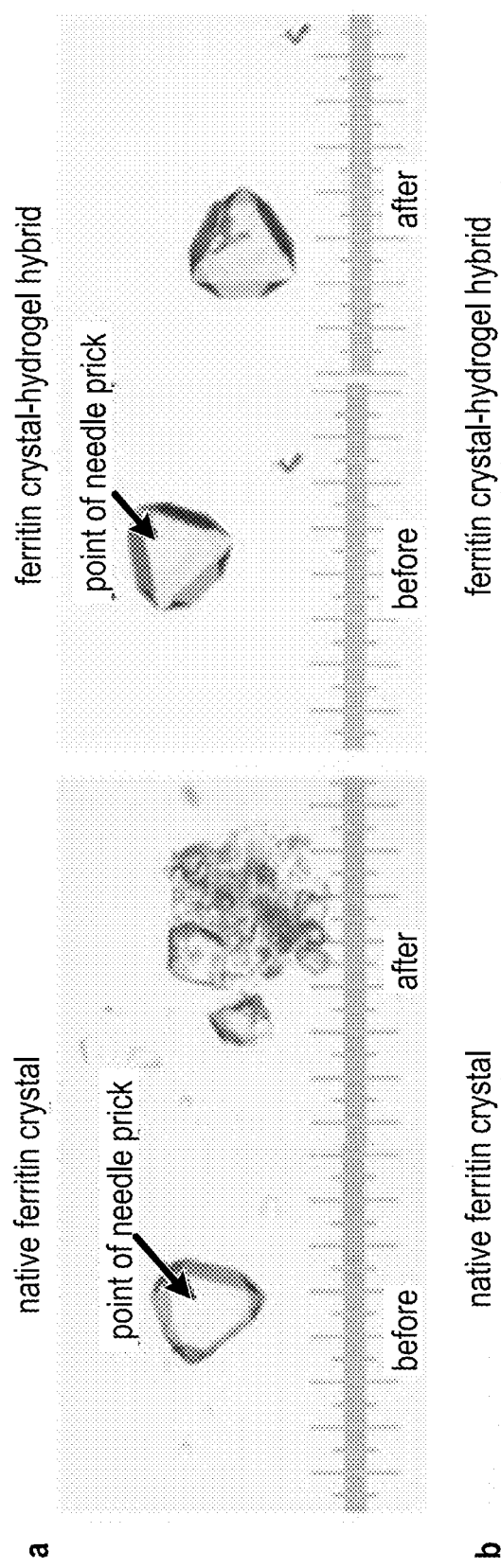
FIG. 12 depicts an example of hydrogel integration that increases the toughness of ferritin crystals, in accordance with some example embodiments.

FIG. 11 depicts self-healing behavior and functionalization of ferritin crystal-hydrogel hybrids. FIG. 11a depicts light microscopy images of crystal-hydrogel hybrids, showing the self-healing of cracks that appear during Ca-induced contraction. FIG. 11b depicts examples of cracks that can also appear during crystal expansion or during the initial stages of NaCl-induced contraction, but eventually self-heal. The arrows point to the termini of the major crack extending through the crystal. FIG. 11c depicts an example schematic of crack formation and self-healing through the interactions between polymer strands and ferritin molecules. FIG. 11d depicts isotropic expansion and contraction of a crystal-hydrogel hybrid with an expandable core and an expandable shell. FIG. 11e depicts an example of swelling-induced fragmentation of the shell of a crystal-hydrogel hybrid with a fixed core and expandable shell. All scale bars, as well as the separation between the major ticks of the ruler in e, correspond to a length of 100 μm.

Figure 13:
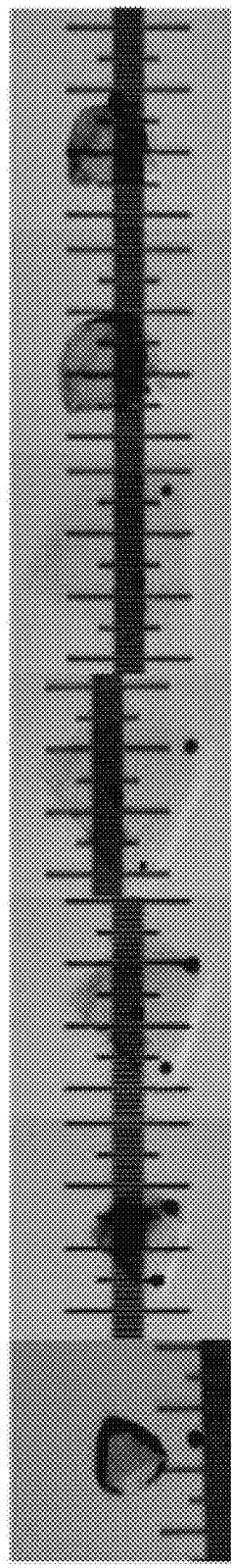
FIG. 13 depicts an example of expansion and contraction of a crystal-hydrogel hybrid containing Fe-loaded ferritin molecules, in accordance with some example embodiments.

Due to the inherent chemical tailorability of ferritin molecules, the crystal-hydrogel hybrids may be functionalized in different ways. They may be constructed from ferritin molecules with mineralized ferrihydrite in their interior cavity (FIG. 13), thus exploiting ferritin's native function as a ferroxidase, or with fluorescent tags covalently attached to their exterior (FIGS. 11d and 11e). FIG. 13 depicts examples of light-microscopy images showing the expansion and contraction of a crystal-hydrogel hybrid containing Fe-loaded ferritin molecules. The separation between the major ticks of the ruler is 100 μm. Additionally, spatially differentiated, core-shell crystals may be created using a layer-by-layer growth method (FIGS. 11d and 11e). When infused with p(Ac-Am), such nanoparticle- or fluorophore-functionalized lattices display the same isotropic expansion/contraction behavior as non-functionalized ones. The layer-by-layer growth process may further modified whereby the core lattice domain (labeled with rhodamine groups) may be covalently fixed through the chemical crosslinking of ferritin molecules with glutaraldehyde, followed by the growth of an uncrosslinked, unlabeled shell layer and the incorporation of the p(Ac-Am) polymer into the composite lattice. Hydration of such 'fixed core/expandable shell' crystals may lead to a complete fragmentation of the shell layer due to the strain generated at the mechanically mismatched core-shell interface, exposing the morphologically unaltered core layer (FIG. 11e). These examples highlight the facility with which chemical and mechanical patterning are achieved in protein crystal-hydrogel hybrids.

Disclosed herein are materials that integrate macromolecular protein crystals with synthetic polymer networks. These hybrids combine the structural order and periodicity of crystals, the adaptiveness and tunable mechanical properties of polymeric networks, and the chemical versatility of protein building blocks. Additionally, the ability to reversibly expand/contract crystal lattices and mobilize the protein components may provide a new means to improve X-ray diffraction quality and explore otherwise inaccessible protein structural states using three-dimensional protein crystallography. Protein crystals are often highly porous, sometimes containing up to 90% solvent, and are usually assembled through weak, non-covalent packing interactions; therefore, our approach should be applicable to other protein lattices. Their potential for generalizability, coupled with the chemical tailorability of synthetic polymers and the genetic mutability of proteins, should make protein crystal-hydrogel hybrids a rich medium for materials science.

Example Methods

The descriptions below detail some illustrative examples of methods related to the disclosed subject matter. Other methods may be used in addition to the following methods or instead of them.

Protein Expression, Purification, and Characterization.

The plasmid for the ΔC* variant of human heavy-chain ferritin (HuHF), devoid of all native cysteine residues (C90E, C102A, and C130A), was obtained via site-directed mutagenesis as previously described. Expression and purification of ΔC* was performed according to the previously published protocol.

Determination of Zeta Potential with DLS.

Purified ferritin was concentrated to about 200 μM and exchanged into a buffer solution containing 50 mM 2,2-Bis(hydroxymethyl)-2,2',2"-nitrilotriethanol (Bis-Tris) (pH 6.0), 50 mM 4-(2-hydroxyethyl)-1-piperazineethanesulfonic acid (HEPES) (pH 7.0) or 50 mM HEPES (pH 7.5) utilizing an Amicon Ultra centrifugal filter unit (10 kDa cutoff). The zeta potentials of ferritin in the three different buffers were determined using a Zetasizer Nano ZS90 (Malvern Instruments). Experimental runs were performed to collect 12 datasets with a He—Ne laser at 633 nm.

Formation of Crystal-Hydrogel Hybrids.

Polymer precursor solution: 25 mM 4-(2-hydroxyethyl)-1-piperazineethanesulfonic acid(HEPES; pH 7.0), 30 mM $CaCl_2$, 917 mM (8.625% w/v) sodium acrylate, 352 mM (2.5% w/v) acrylamide, and 13 mM (0.2% w/v) N,N'-methylenebisacrylamide. Polymerization solution: 4 M NaCl, 1% w/v APS, and 1% v/v TEMED. Octahedron-shaped ferritin crystals formed over 1-2 days in a buffered solution containing 25 mM HEPES pH 7.0, 3-14.5 μM protein (per 24meric ferritin cage), and 4.5-7.5 mM $CaCl_2$. Once the ferritin crystals matured, the crystallization solution was replaced with the polymer precursor solution. The crystals were soaked for >10 h to ensure full infusion of the monomers into the ferritin crystals and then individually transferred with a mounted CryoLoop (Hampton) to the polymerization solution for 5 min, initiating in crystallo polymerization. Alternatively, the crystallization solution was replaced with the polymerization solution for the bulk polymerization of many crystals at once.

Measurement of the Rate of Diffusion into Ferritin Crystals.

A large ferritin crystal was transferred with a mounted CryoLoop onto a glass slide and 20 μL of a solution containing 20 μM (0.01 mg/mL) rhodamine B, 30 mM $CaCl_2$, and 25 mM HEPES (pH 7.0) was added to the crystal. The rhodamine diffusion process was monitored with a 10× air objective installed on a spinning-disk confocal Axio Observer inverted microscope (Zeiss) equipped with a pair of Quantum 5125C cameras (Roper), using a filter to collect light at 575-650 nm (red channel). Differential interference contrast (DIC) and fluorescence (564 nm excitation) images were captured at is intervals with 10 ms exposures. Images were collected in Slidebook 6 (Intelligent Imaging Innovations) and analyzed using Fiji (http://fiji.sc/Fiji).

Determination of in Crystallo Polymerization Dynamics.

Ferritin crystals were incubated in a polymer precursor solution supplemented with 5.7 mM (0.3%) pyranine (Sigma-Aldrich). After 12 h, an individual crystal was transferred onto a glass slide and polymerization was initiated by adding 10 μL of the polymerization solution. Hydrogel polymerization throughout the crystal and the corresponding decrease of pyranine fluorescence were monitored with a 20× air objective on a confocal microscope as described above using a filter to collect light at 500-550 nm (green channel). DIC and fluorescence (488 nm excitation) images were captured at is intervals with 1 s exposures.

Scanning Electron Microscopy of Ferritin Crystals.

Native ferritin crystal and crystal-hydrogel hybrid samples were deposited onto glow-discharged, Formvar/carbon-coated Cu grids (Ted Pella Inc.). Each grid was blotted with filter paper to remove excess liquid. Grids were mounted onto a STEM 12× v2 sample holder and imaged using a Sigma 500 scanning electron microscope (Zeiss) at an accelerating voltage of 1 kV using a 30-μm aperture.

Figure 16B:
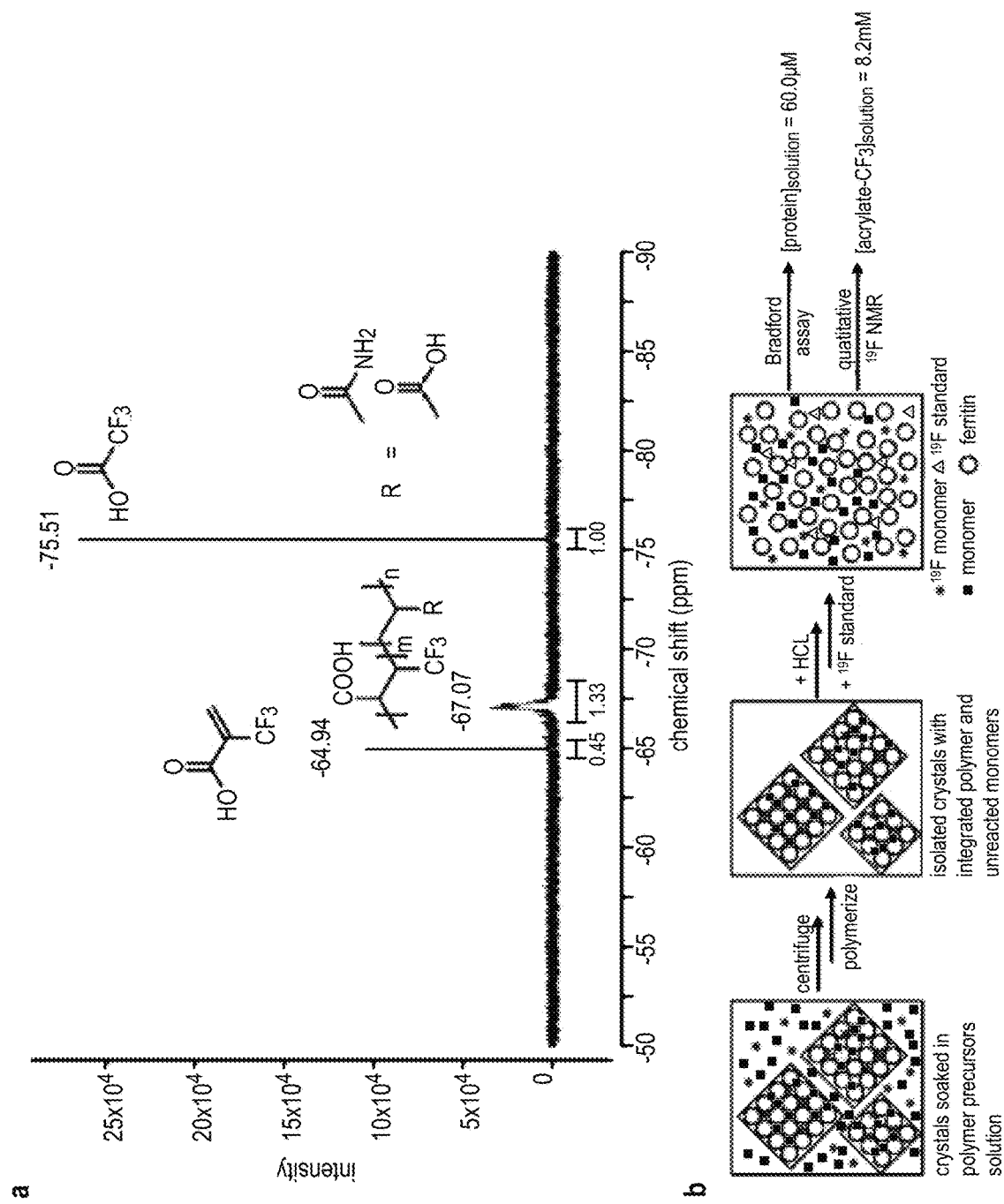
FIG. 16B depicts an example of quantification of an acrylic acid analogue using fluorine-19 nuclear magnetic resonance spectroscopy ($^{19}F$ NMR), in accordance with some example embodiments.

Polymer quantification with 19F NMR. Large-scale crystallization of ferritin was carried out in a 24-well culture plate (Costar). 100 μl of 25 μM ferritin in 15 mM Tris (pH 7.4) and 150 mM NaCl was combined with 100 μl of a buffered solution containing 50 mM HEPES (pH 7.0) and 12 mM CaCl2. Crystals formed overnight and matured over 72 h. The solution in each well was replaced with 100 μl of a polymer precursor soaking solution containing: 25 mM HEPES (pH 7.0), 30 mM CaCl2, 179.9 mM 2-(trifluoromethyl)acrylic acid, 744.8 mM sodium acrylate, 350.7 mM acrylamide and 20.4 mM N,N'-methylenebis(acrylamide). After soaking overnight, this solution was removed, and the crystals were washed with a buffered solution (25 mM HEPES, pH 7.0; 30 mM $CaCl_2$) to remove unincorporated monomers. Polymerization was initiated by replacing the washing solution with 100 μL of the polymerization solution. After 10 min, the crystals were transferred into an Eppendorf tube and centrifuged at 2,000 g for 60 s. The supernatant was decanted, and the crystals were resuspended in 1 ml $D_2O$. Concentrated HCl was added until the pH of the solution was approximately 4.0 to facilitate crystal decomposition. 705 μl of this solution was transferred into an NMR tube and supplemented with 4.6 mM trifluoroacetic acid. The 19F-NMR spectrum was collected using a 300M Bruker AVA spectrometer with a 19F probe (FIG. 16B). The peak at −64.94 p.p.m. corresponds to free 2-(trifluoromethyl)acrylic acid, the cluster of peaks near −67.07 p.p.m. to 2-(trifluoromethyl)acrylic acid that has been incorporated into the polymer, and the peak at −75.51 p.p.m. to the trifluoroacetic acid standard. From the integration of these peaks it may be deduced that FIG. 16B(a) the total concentration of 2-(trifluoromethyl)acrylic acid in the solution was 8.2 mM and FIG. 16B(b) 74.7% of the monomeric precursor was incorporated into the polymer matrix inside the crystals. The protein concentration was determined to be 60.0 μM using the Bradford assay, and the molar ratio of 2-(trifluoromethyl) acrylic acid to ferritin was calculated as 137:1. Given this ratio and the fact that each unit cell of the ferritin crystals contains four ferritin cages and has a volume of about 5832 nm3 (a=18 nm), the concentration of 2-(trifluoromethyl)acrylic acid in the crystal lattice was calculated as 155.6 mM, which is very similar to its concentration (179.9 mM) in the soaking solution.

Monitoring Crystal Expansion/Contraction by Light Microscopy.

Single crystals were transferred with a mounted CryoLoop onto a glass slide with a microscopic ruler (OMAX). All images and videos were obtained on an SZX7 (Olympus) microscope equipped with an Infinity 1 charge-coupled device (CCD) (Luminera). For crystals that had not been polymerized, 10 μL of the polymerization solution was carefully added to minimize crystal movement. This solution was removed prior to water addition. For previously polymerized crystals, water (Milli-Q, 30 μL) was added and crystal expansion was observed over 5-20 min. To initiate crystal contraction, water was replaced with a solution containing either 4 M NaCl or 1 M $CaCl_2$. Crystal contraction typically occurs rapidly (1-2 min). This expansion/contraction cycle could be repeated many times for a crystal if NaCl was used to induce crystal contraction. Crystal size was determined by measuring the edge length of a facet relative to the microscopic ruler using the Fiji image processing package.

Monitoring Crystal Expansion by Confocal Microscopy.

Crystals containing polymer precursors were prepared and transferred into the polymer precursor solution as described above. One of these crystals was transferred onto a clean glass slide and imaged on a confocal microscope. After capturing an initial image, the crystal was polymerized in 10 μL of the polymerization solution, and expansion in 30 μL water was monitored. DIC images were captured at different time intervals with 100 ms exposure until the crystal was no longer visible.

Quantification of Protein Release During Expansion.

Large-scale crystallization of ferritin was carried out as described above. Once crystals fully matured, the well solution was replaced with 100 μL of the polymer precursor solution. After 12 h, the crystals were all combined into a single Eppendorf tube and 500 μL of the polymerization solution was added. Crystals were expanded by replacing the polymerization solution with 1 mL water. During this experiment, aliquots (100 μL) of the protein solution were removed, replaced with 100 μL of water, and each aliquot was used to determine the protein concentration using the Bradford assay.

Multi-Crystal Expansion Monitored Using SAXS.

Crystals for multi-crystal small-angle X-ray scattering were prepared as described above and transferred into the polymer precursor solution. A large number (n>100) of crystals were transferred to an Eppendorf tube. After the crystals had settled at the bottom, they were transferred, along with 50 μL of solution into a 1.5-mm quartz capillary (Hampton). Crystals in capillaries were analysed at beamline 5-ID-D of the Advanced Photon Source (Argonne National Laboratory). Data were collected using collimated X-ray radiation (0.7293 Å, 17 keV) calibrated with both a glassy carbon standard and a silicon diffraction grating. After the sample was mounted on the instrument, a thin tube (with a diameter of 0.51 mm) was inserted into the capillary to facilitate the addition of 50 μL of solution with a syringe injector during x-ray exposure. The injected solution contained a more concentrated polymerization solution without NaCl (2% APS and 2% TEMED) in water. After the first exposure, the solution was injected and an image with a 1-s X-ray exposure was collected every 30 s. Peaks corresponding to the original lattice were visible throughout the process, indicating that some of the crystals in the bulk sample did not expand. This is probably due to limited solvent diffusion or incomplete polymerization within the capillary tubes used for the SAXS experiments. It is important to note that in this procedure, 'polymerized' crystals immediately began expanding upon the commencement of data collection. The reason for this experimental strategy (instead of polymerization in a high-ionic-strength solution, followed by the initiation of expansion through lowering the ionic strength) is that it was not possible to sufficiently dilute the high-ionic-strength polymerization solution in the thin capillary tubes used for SAXS (which cannot accommodate addition of large volumes of solution) to enable expansion.

Scattered radiation was detected using a CCD area detector and one-dimensional scattering data were obtained through the azimuthal averaging of the two-dimensional data to produce plots of the scattering intensity as a function of the scattering vector length, $q=4\pi \sin(\theta/\lambda)$ where $\theta$ is one-half of the scattering angle and $\lambda$ is the wavelength of the X-rays used. Analysis of the one-dimensional data was performed using the powder diffraction processing software JADE (MDI) or Origin (OriginLab).

Multi-Crystal SAXS at Elevated Temperatures.

Large-scale crystallization of ferritin was performed as described above. The crystallization solution was removed, and ferritin crystals were resuspended in either the polymer precursor solution or a buffered solution containing 25 mM HEPES (pH 7.0) and 30 mM CaCl2. After 72 h, the polymer precursor soaking solution was replaced with the polymerization solution. After 10 min, this was also replaced with a buffered solution containing 25 mM HEPES (pH 7.0), 4 M NaCl and 30 mM CaCl2. Both samples, containing either native ferritin crystals or the crystal-hydrogel hybrids, were transferred into 1.5-mm quartz capillaries (Hampton). Data were collected at beamline 4-2 of SSRL using collimated X-ray radiation (1.1271 Å, 11 keV) calibrated with a silver behenate standard. The samples were heated using a custom-built thermal stage operating at 1° C. $min^{-1}$, and images with a 1-s X-ray exposure were collected every minute. Scattered radiation was detected using a Pilatus3 X 1M detector (Detectris) and processed as described above.

Single-Crystal SAXS.

Crystals containing the polymer precursors were prepared and as described above and shipped to Stanford Synchrotron Radiation Lightsource (SSRL) for analysis. Crystals were polymerized on site in the polymerization solution as described above and were analysed at SSRL (beamline 4-2). Single crystals may be harvested with a mounted CryoLoop and transferred into a 2 M NaCl solution in a 400 μm-diameter central well of a microfluidic chip. The microfluidic chip may be sealed with a coverslip, attached to a syringe injector, and mounted on beamline 4-2 at SSRL for data collection. Data may be collected using collimated X-ray radiation (1.127 Å, 11 keV) calibrated with a silver behenate standard. Water may be injected into the microfluidic chip at 1 μl $s^{-1}$ to initiate expansion, and 0.5-s-exposure images were taken every about 2.5 s for 4 min. After the data acquisition for crystal expansion is complete, the process may be repeated—in the order 4 M NaCl, water, 1 M $CaCl_2$, water—to monitor repeated contraction and expansion processes. Data may be collected using a Pilatus3 X 1M detector (Detectris). The unit-cell parameters may be determined by calculating the radial distance of individual reflections, after fitting the spot intensity to a two-dimensional Gaussian surface.

Single-Crystal XRD at Room Temperature.

Crystals containing polymer precursors were prepared and imaged by light microscopy as described above. A single crystal was transferred onto a MicroMount precision tool (MiTeGen) with a 100 μm aperture and sealed with a MicroRT Capillary (MiTeGen). Data were acquired on a Bruker APEX II CCD diffractometer using Cu Kα radiation (1.5418 Å) at 295 K. Three images (60 s exposure) were collected at rotation angles ϕ=0°, 60° and 120°. The crystal was removed from the instrument and soaked in 10 μL of the polymerization solution for 2 min. The crystal was transferred onto a clean microscopic ruler and 30 μL water was added. Crystal expansion was measured over 3 min. This crystal was returned to the MicroMount with the MicroRT capillary and an identical three-image dataset was collected. This process was repeated using 30 μl of a 1 M CaCl2 solution. After the crystal had contracted (1 min), another three-image dataset was collected. Images were analyzed with the Apex III software.

Single-Crystal XRD at 100 K.

Crystal-hydrogel hybrids were prepared and imaged using light microscopy as described above. Two crystals were harvested, 30 μL of water was added, and crystal expansion was monitored over 5 min for both crystals. After 5 min, the water was removed and 30 μL of either a solution containing 1 M CaCl2 (Crystal A) or 4 M NaCl (Crystal B) was added. Crystal B was re-expanded in 30 μL water. After 5 min, water was replaced with 30 μL of a 1 M CaCl2 solution to contract Crystal B. After contraction, both crystals were cryoprotected in perfluoropolyether (Hampton) and frozen in liquid N2. Single-crystal XRD data for the contracted ferritin crystals were collected at 100 K at beamline 9-2 of SSRL using 0.98-Å radiation. The data were integrated using iMosflm and scaled with Aimless (FIG. 10). The structures for Crystal A and Crystal B were determined at resolutions of 1.06 Å and 1.13 Å, respectively. Molecular replacement was performed with Phaser using the HuHF structure (PDB ID: 5CMQ) as a search model. Rigid-body, positional, anisotropic thermal, and atom-occupancy refinements were carried out using Phenix. Coot was used for iterative manual model building. The interstitial solvent content was calculated by subtracting the solvent volume of each crystal from the volume of the inner cavity of ferritin (calculated using VOIDOO). All figures were produced with Pymol.

Nanoindentation measurements of crystals. The mechanical properties of the native ferritin crystals and the crystal-hydrogel hybrids were determined using a Hysitron TI 950 Triboindenter test instrument (Bruker). All crystals were dried before the indentation experiments. A Berkovich probe (TI-0039, 142.3°, 100 nm tip radius) was used to determine the hardness and reduced modulus of the native crystals and crystal-hydrogel hybrids. Experiments were conducted in displacement control mode using a displacement of 1,000 nm. Preparation of iron-loaded ferritin. Iron-loaded ferritin was prepared by adding 10.8 mL of 10 mM $(NH_4)_2Fe(SO_4)_2$ over 2 h to 144.8 ml of a vigorously stirring solution containing 1 μM ferritin, 15 mM Tris (pH 7.4) and 150 mM NaCl. After the addition was complete, the solution was stirred for an additional hour before being concentrated to about 3 mL using a 10 kDa Amicon membrane. A 10DG column (Bio-Rad) was used to remove any unbound iron. Iron content was assessed by using a 2-2'-bipyridine-based colorimetric assay and the protein concentration was determined using the Bradford assay. Each ferritin cage contained about 800 Fe atoms.

Formation of Core-Shell Ferritin Crystals.
Expandable Core/Expandable Shell Crystals.

Mature ferritin crystals were transferred to a buffered solution containing 25 mM HEPES (pH 7.0), 30 mM $CaCl_2$, and 1.9 mM (1 mg/mL) 5-(and 6)-carboxytetramethyl rhodamine succinimidyl ester (NHS-rhodamine; Thermo Fisher Scientific). After soaking for 12 h, an individual crystal was removed and washed three times in a buffered solution containing 25 mM HEPES (pH 7.0) and 30 mM $CaCl_2$ to remove unbound NHS-rhodamine. The crystal was transferred to a well containing 10 μL of 12.5 μM ferritin, 25 mM HEPES (pH 7.0), and 6 mM CaCl2. A transparent layer of ferritin formed around the rhodamine-labeled ferritin crystal over 12 h (creating a red core and a transparent shell). This crystal was soaked in a polymer precursor solution and polymerized as described above to yield an expandable core/expandable shell crystal.

Fixed Core/Expandable Shell Crystals.

Fixed core/expandable shell ferritin crystals were prepared similarly to the expandable core/expandable shell crystals described above. The only difference was that after the rhodamine labeling step, the crystal was transferred into a solution containing 2.5% v/v glutaraldehyde, 25 mM HEPES (pH 7.0) and 30 mM $CaCl_2$. After 12 h, the crystal was washed five times with water to remove unbound glutaraldehyde, followed by the epitaxial growth of the transparent layer of ferritin crystals on top of the core layer in a fresh crystallization solution containing 12.5 μM ferritin. This crystal was then soaked in a polymer precursor solution and polymerized as described above to yield a fixed core/expandable shell crystal.

Data Availability.

Crystal structures have been deposited in the Research Collaboratory for Structural Bioinformatics Protein Data Bank under accession codes 6B8F (ferritin-polymer hybrid crystal 1; https://www.rcsb.org/structure/6b8f) and 6B8G (ferritin-polymer hybrid crystal 2; https://www.rcsb.org/

FIG. 7 depicts examples of alternative hydrogel formulations. FIG. 7a depicts examples of alternative monomer combinations that yield successful in crystallo-polymerization and crystal expansion. FIG. 7b depicts examples of monomer combinations that lead to crystal dissolution during polymerization. FIG. 7c depicts an example of a crystal soaked in a solution containing polyacrylate (molecular weight, Mw=2,100 Da) dissolves upon being transferred into water. The separation between the major ticks of the ruler is 100 μm. MBAm, N,N'-methylenebis(acrylamide).

FIG. 8 depicts examples of SAXS imaging of a single crystal-hydrogel hybrid in a microfluidic chip. FIG. 8d depicts examples of single-crystal SAXS diffraction patterns observed at different stages of crystal expansion and contraction. The Miller indices of each visible spot are indicated. Reflections with the highest signal-to-noise ratio (I/σI) are circled in red. FIG. 8e depicts examples of spot profiles of the highest-I/σI reflections indicated in FIG. 8d.

Figure 17:
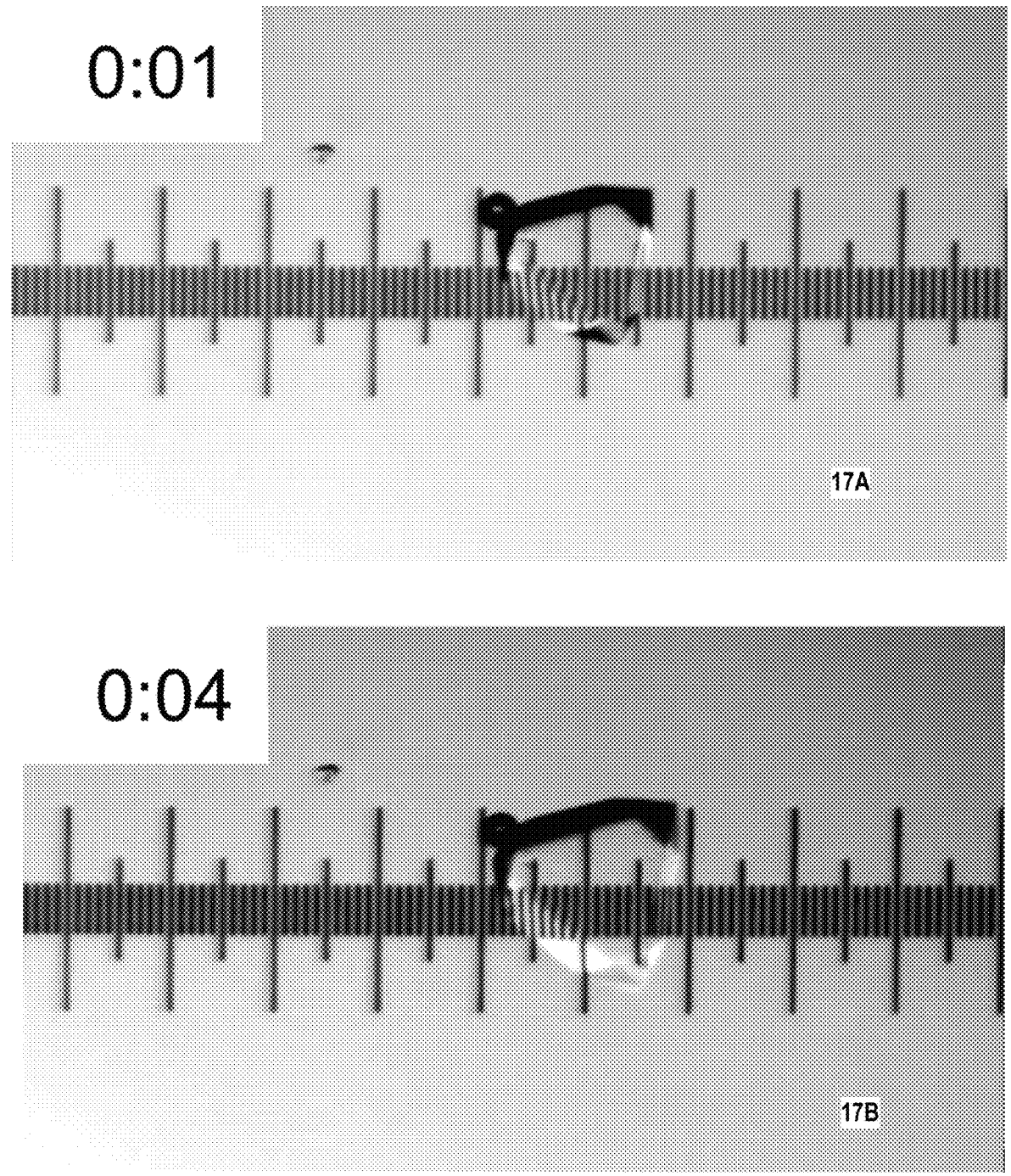
FIGS. 17-19 depict self-healing of a crystal-hydrogel hybrid material over a time period, in accordance with some example embodiments.
Figure 18:
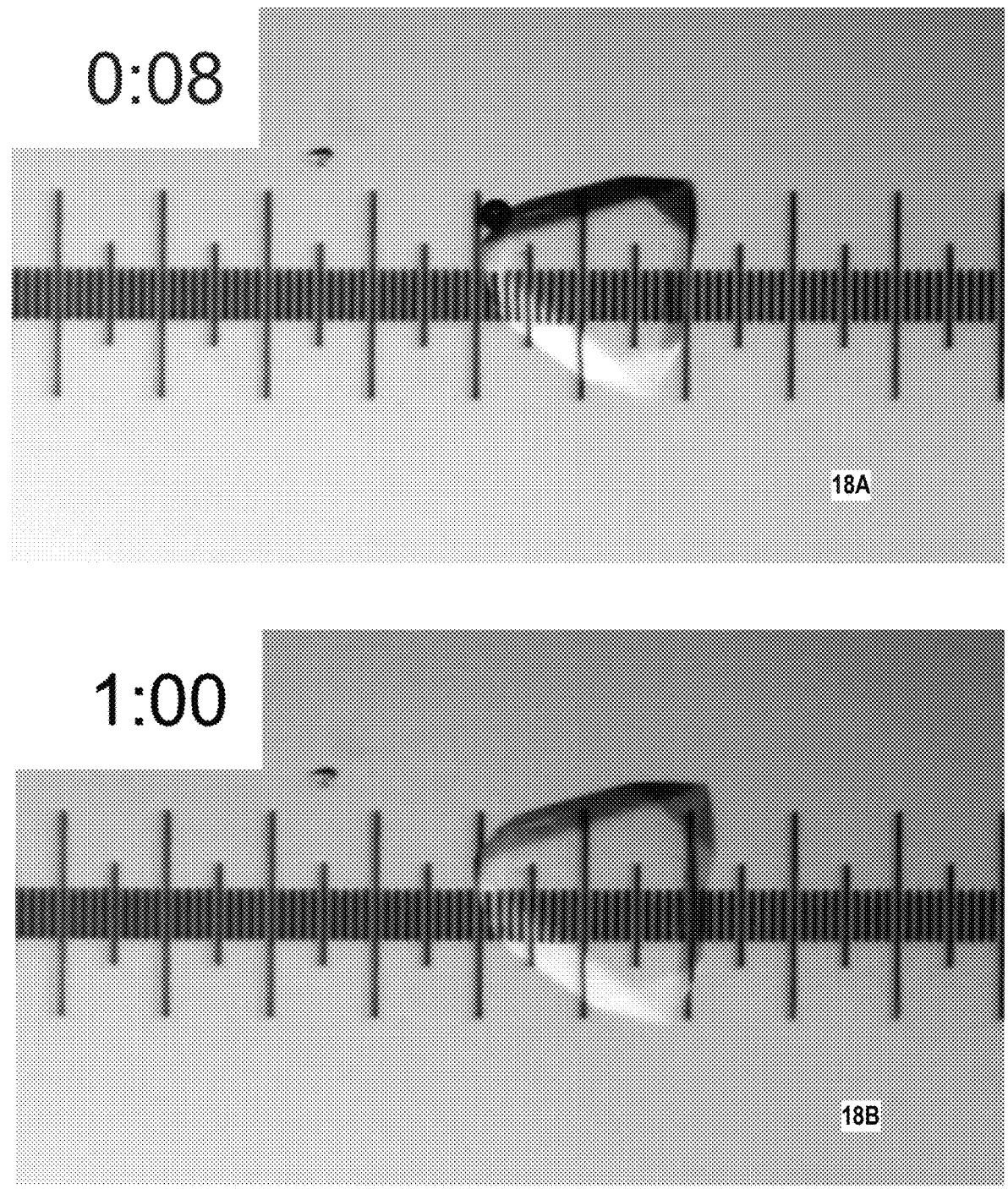
Figure 19:
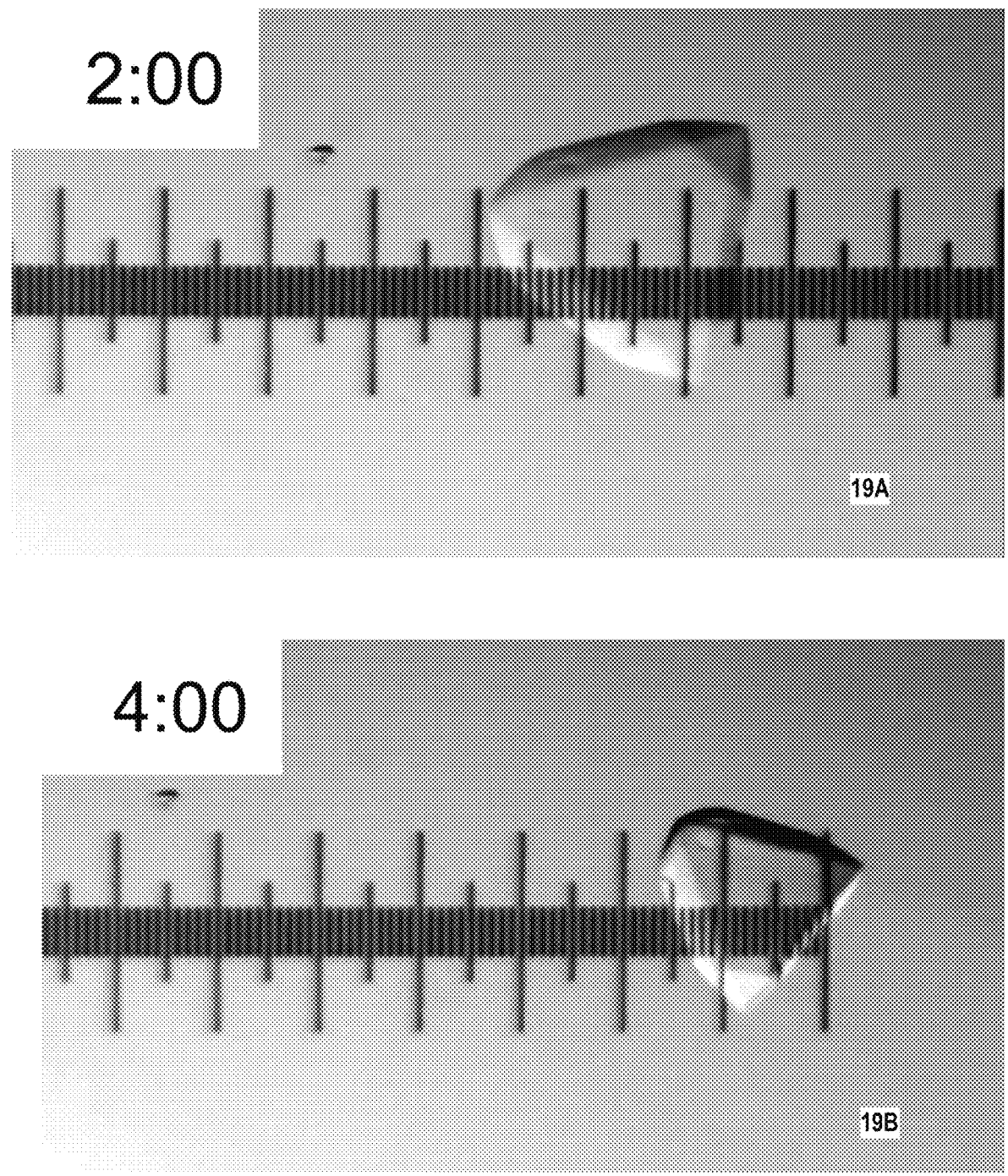
Figure 20:
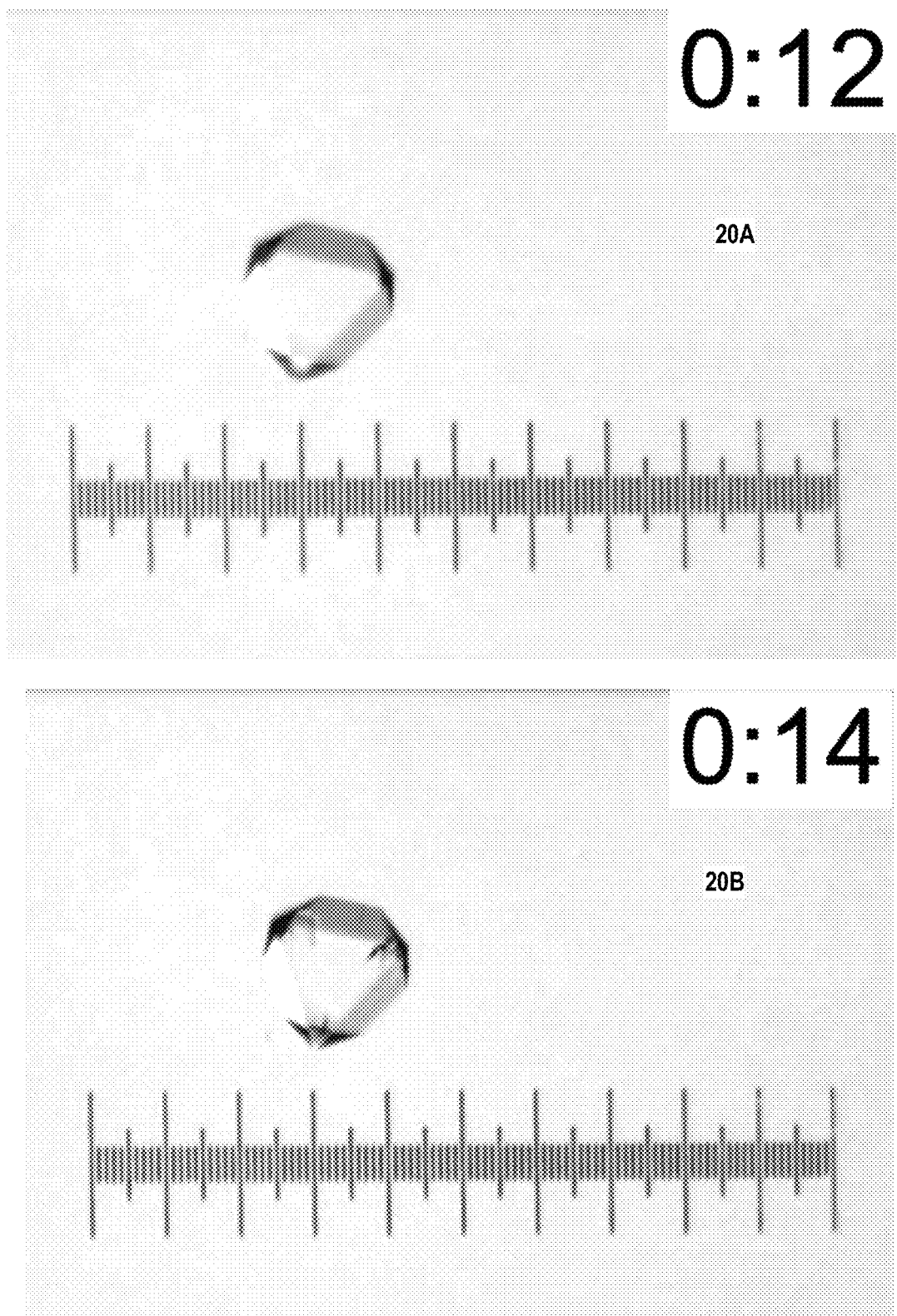
FIGS. 20-23 depict contraction of a crystal-hydrogel hybrid material over a time period, in accordance with some example embodiments.
Figure 21:
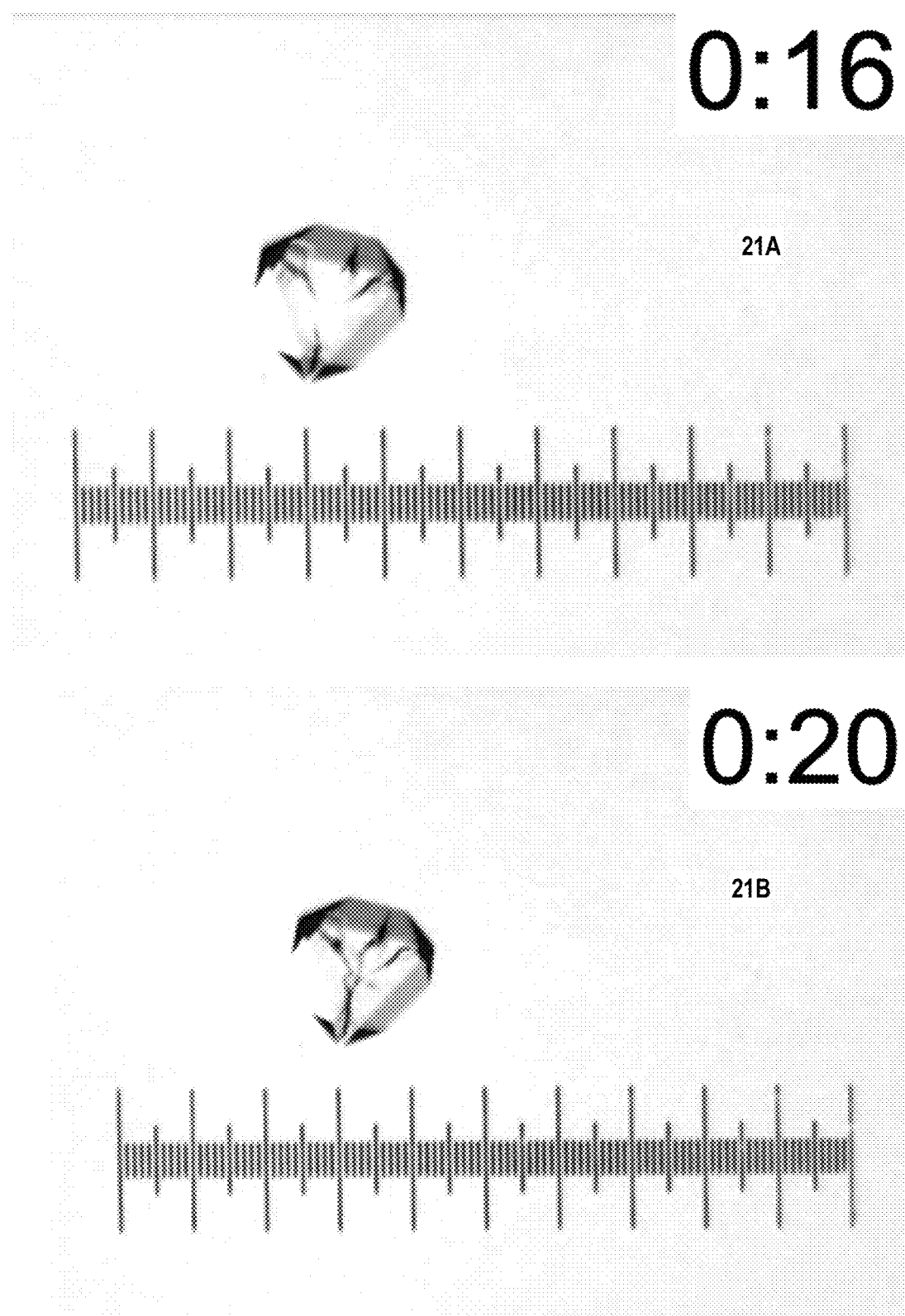
Figure 22:
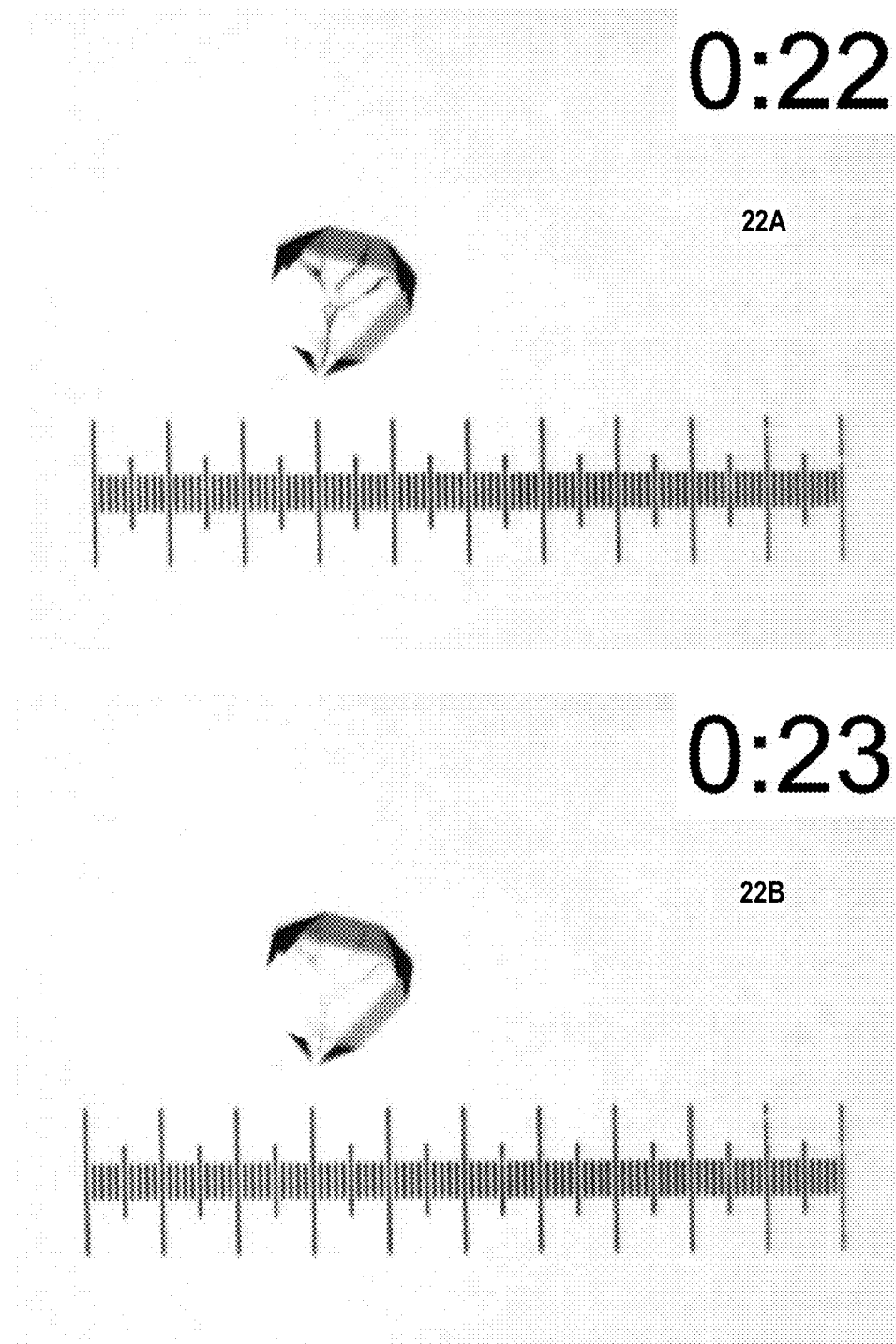
Figure 23A:
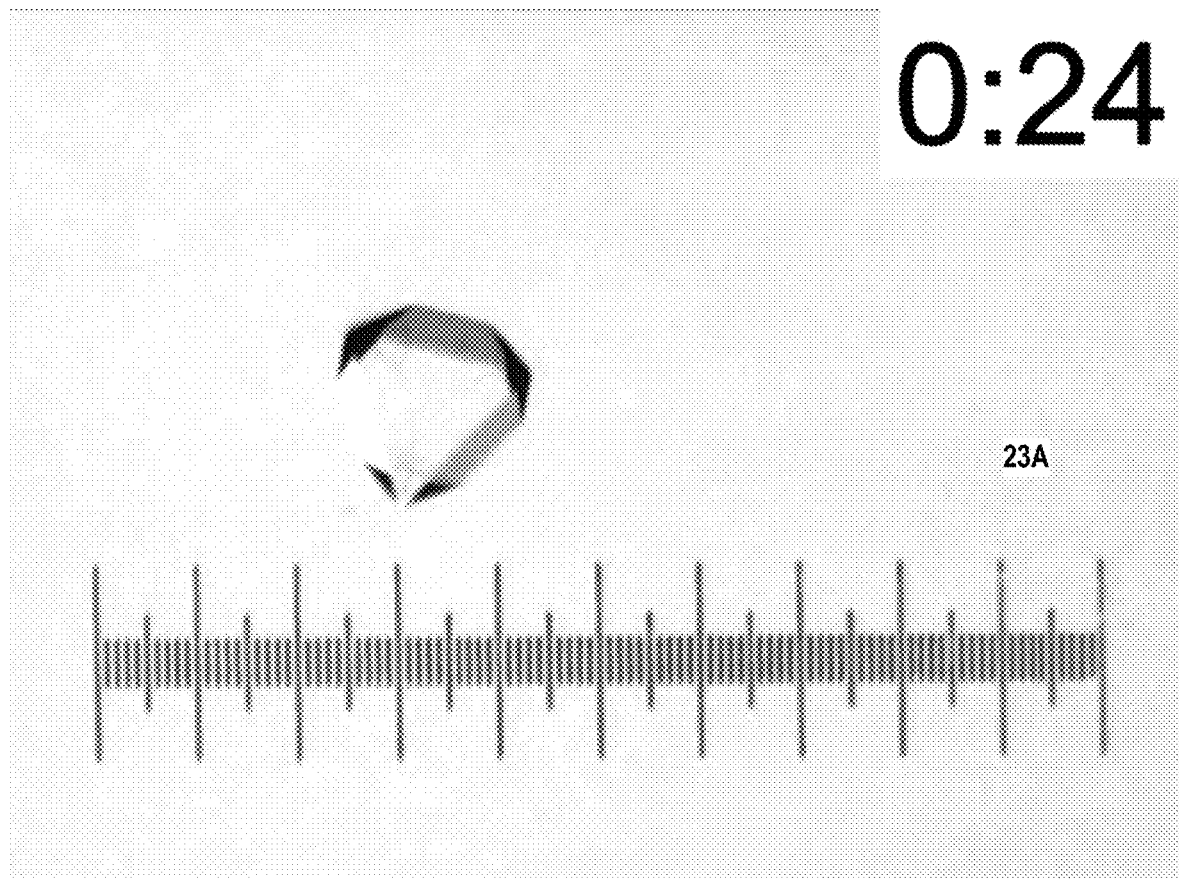

FIGS. 17-19 depict an example of a sequence of images showing a crystal-hydrogel hybrid material growing in size and volume over time or swelling. In the upper left corner of each image is an elapsed time, where the zero time is the time that the crystal-hydrogel was first exposed to water or a solution that causes expansion.

FIGS. 20-23 depict an example of a sequence of images showing a crystal-hydrogel hybrid material shrinking in size and volume over time, or deswelling. In the upper right corner of each image is an elapsed time, where the zero time is the time that the crystal-hydrogel was first exposed to sodium chloride or other solution that causes contraction. Cracks in the crystal-hydrogel can be seen in FIG. 21 and self-healing over FIGS. 22-23.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various elements in the embodiments described in this patent document should not be understood as requiring such separation in all embodiments.

Only a few implementations and examples are described and other implementations, enhancements and variations can be made based on what is described and illustrated in this patent document.

What is claimed is:

1. A flexible crystalline material comprising:
   a three-dimensional macromolecular crystal lattice including a plurality of molecules connected via intermolecular contacts; and
   a polymer distributed throughout the three-dimensional macromolecular crystal lattice and reversibly bonded to the molecules of the three-dimensional macromolecular crystal lattice via ionic and hydrogen-bonding interactions, wherein the polymer changes one or more properties of the three-dimensional macromolecular crystal lattice in response to exposure to a material with one or more selected characteristics.

2. The flexible crystalline material of claim 1, wherein the one or more properties of the three-dimensional macromolecular crystal lattice include one or more of flexibility, brittleness, or hardness.

3. The flexible crystalline material of claim 1, wherein the one or more properties include one or more of ionic content, ionic strength, temperature, or pH.

4. The flexible crystalline material of claim 1, wherein the three-dimensional macromolecular crystal lattice and the polymer are structured so that the exposure to the material with the one or more selected characteristics causes the three-dimensional macromolecular crystal lattice to self-repair damage to a crystal structure.

5. The flexible crystalline material of claim 1, wherein the three-dimensional macromolecular crystal lattice and the polymer are selected so that intermolecular interactions between the plurality of molecules aid in a movement of subunits to their original locations during deswelling, allowing the three-dimensional macromolecular crystal lattice to self-heal.

6. The flexible crystalline material of claim 1, wherein the polymer is a hydrogel polymer comprising poly(acrylate-acrylamide).

7. The flexible crystalline material of claim 6, wherein the three-dimensional macromolecular crystal lattice and the polymer are selected so that,
   when the flexible crystalline material is exposed to water, the hydrogel polymer causes the flexible crystalline material to expand in size, or
   when the flexible crystalline material is exposed to a solution including sodium chloride, the hydrogel polymer causes the flexible crystalline material to contract in size.

8. The flexible crystalline material of claim 1, wherein the three-dimensional macromolecular crystal lattice and the polymer are selected to enable the flexible crystalline material to return to one or more original dimensions after the flexible crystalline material is exposed to calcium chloride.

9. The flexible crystalline material of claim 1, wherein the polymer includes polymerized monomers which are infused into the three-dimensional macromolecular crystal lattice and subsequently polymerized.

10. The flexible crystalline material of claim 1, wherein the three-dimensional macromolecular crystal lattice is a protein crystal or comprises ferritin.

11. The flexible crystalline material of claim 1, wherein the three-dimensional macromolecular crystal lattice includes amino acids, deoxyribonucleic acid (DNA), or ribonucleic acid (RNA).

12. The flexible crystalline material of claim 1, wherein the flexible crystalline material is capable of repeatedly swelling and deswelling, wherein each time the flexible crystalline material deswells, the crystal lattice reforms.

13. The flexible crystalline material of claim 1, wherein the crystal lattice is configured as a face centered cubic (fcc) structure.

14. The flexible crystalline material of claim 13, wherein the fcc structure is characterized by a mesoporous network including cube-shaped chambers that are interconnected by octahedron shaped cavities.

15. A flexible crystalline material comprising:
   a three-dimensional macromolecular crystal lattice including a plurality of molecules connected via intermolecular contacts; and
   a polymer distributed throughout the three-dimensional macromolecular crystal lattice and reversibly bonded to the molecules of the three-dimensional macromolecular crystal lattice via ionic and hydrogen-bonding interactions, wherein when the flexible crystalline material is exposed to a first liquid the polymer expands and changes the three-dimensional macromolecular crystal lattice, and when exposed to a second liquid the polymer contracts and the three-dimensional macromolecular crystal lattice is restored.

16. The flexible crystalline material of claim 15, wherein the polymer is a hydrogel polymer comprising poly(acrylate-acrylamide).

17. The flexible crystalline material of claim 15, wherein intermolecular interactions between the plurality of molecules aid in movement of subunits to their original locations during deswelling, allowing the crystal lattice to self-heal.

18. The flexible crystalline material of claim 15, wherein the first liquid is water that causes the flexible crystalline material to expand in size, or wherein the second liquid is a sodium chloride solution that causes the flexible crystalline material to contract in size.

19. The flexible crystalline material of claim 15, wherein the flexible crystalline material returns to one or more original dimensions after the flexible crystalline material is exposed to a calcium chloride solution.

20. The flexible crystalline material of claim 15, wherein a plurality of monomers are infused into the three-dimensional macromolecular crystal lattice, and subsequently polymerized to form the polymer.

21. The flexible crystalline material of claim 15, wherein the flexible crystalline material is capable of repeatedly swelling and deswelling, wherein each time the flexible crystalline material deswells, the crystal lattice self-heals.

* * * * *